(12) United States Patent
Anagawa et al.

(10) Patent No.: US 8,102,623 B2
(45) Date of Patent: Jan. 24, 2012

(54) THIN-FILM MAGNETIC HEAD WITH A MAGNETIC POLE HAVING AN INCLINED STEP AT ITS TOP END SECTION SURFACE, MAGNETIC HEAD ASSEMBLY WITH THE THIN-FILM MAGNETIC HEAD, MAGNETIC DISK DRIVE APPARATUS WITH THE MAGNETIC HEAD ASSEMBLY, AND MANUFACTURING METHOD OF THIN-FILM MAGNETIC HEAD

(75) Inventors: Kenkichi Anagawa, Tokyo (JP); Norikazu Ota, Tokyo (JP)

(73) Assignee: TDK Corporation, Tokyo (JP)

( * ) Notice: Subject to any disclaimer, the term of this patent is extended or adjusted under 35 U.S.C. 154(b) by 1124 days.

(21) Appl. No.: 11/848,778

(22) Filed: Aug. 31, 2007

(65) Prior Publication Data
US 2009/0059438 A1  Mar. 5, 2009

(51) Int. Cl.
*G11B 5/127* (2006.01)
(52) U.S. Cl. ................... 360/125.3; 29/603.16
(58) Field of Classification Search .......... None
See application file for complete search history.

(56) References Cited

U.S. PATENT DOCUMENTS

| | | | | |
|---|---|---|---|---|
| 4,656,546 A | | 4/1987 | Mallory | |
| 5,075,956 A | * | 12/1991 | Das | 29/603.14 |
| 5,920,449 A | * | 7/1999 | Tagawa | 360/122 |
| 2002/0176214 A1 | * | 11/2002 | Shukh et al. | 360/317 |
| 2005/0083605 A1 | * | 4/2005 | Hu et al. | 360/125 |
| 2005/0128637 A1 | * | 6/2005 | Johnston et al. | 360/125 |
| 2005/0219743 A1 | * | 10/2005 | Guan et al. | 360/125 |
| 2005/0243464 A1 | * | 11/2005 | Lille | 360/126 |

FOREIGN PATENT DOCUMENTS

JP    A 2004-326990    11/2004

* cited by examiner

*Primary Examiner* — Mohammad Ghayour
*Assistant Examiner* — Tamara Ashford
(74) *Attorney, Agent, or Firm* — Oliff & Berridge, PLC

(57) ABSTRACT

A thin-film magnetic head with a perpendicular magnetic recording structure includes a main pole layer, a nonmagnetic gap layer, and an auxiliary pole layer facing the main pole layer via the nonmagnetic gap layer. A surface of a top end section of the main pole layer has an inclined step that slopes from a lamination plane of the layers. The surface faces a top end section of the auxiliary pole layer. The top end section of the auxiliary pole layer has side shield sections at a position that is not exposed to an ABS. The side shield sections faces at least part of side surfaces in a track-width direction, of the main pole layer so as to cover at least part of the inclined step.

12 Claims, 21 Drawing Sheets

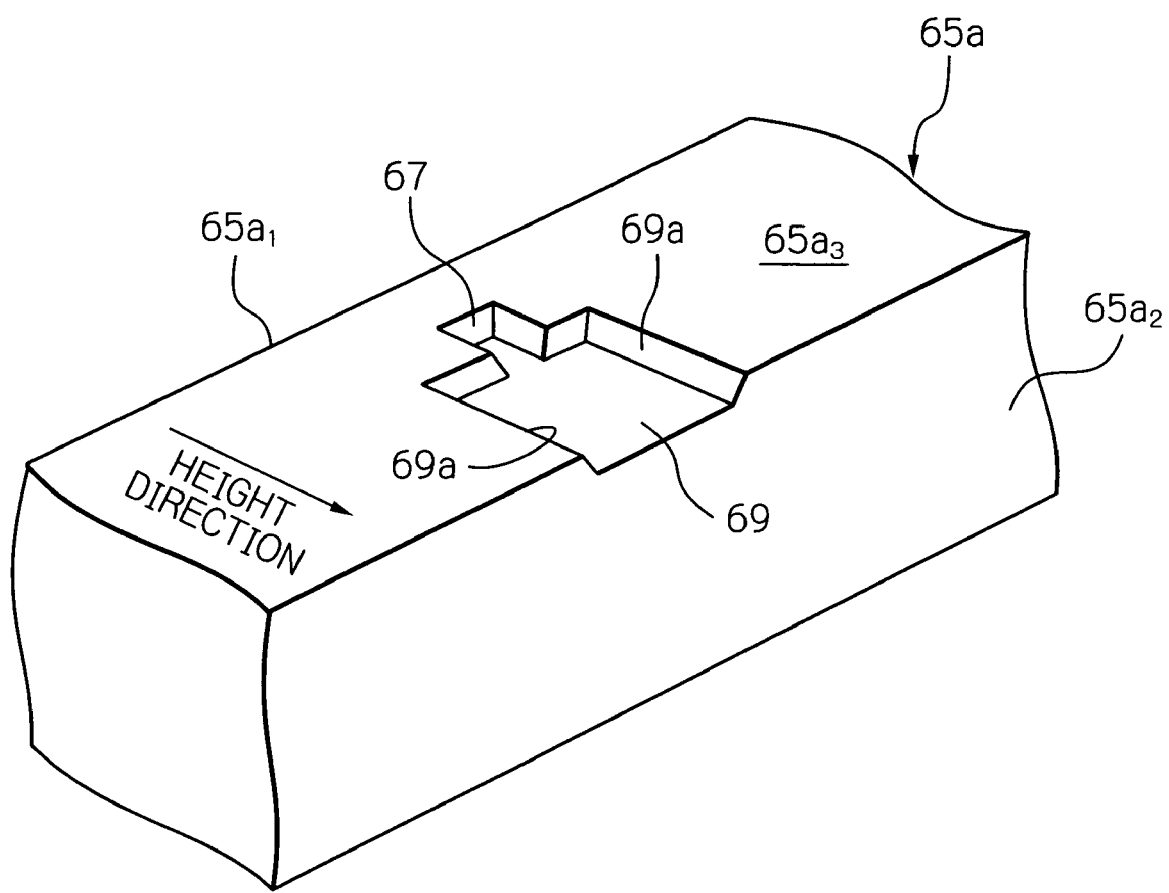

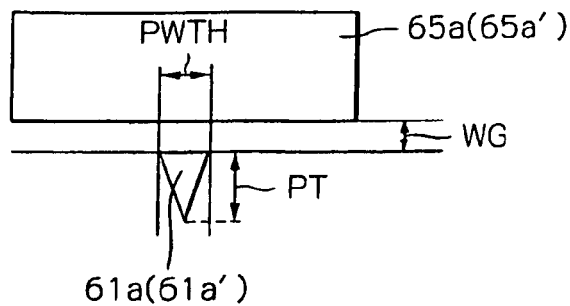
Fig. 9a
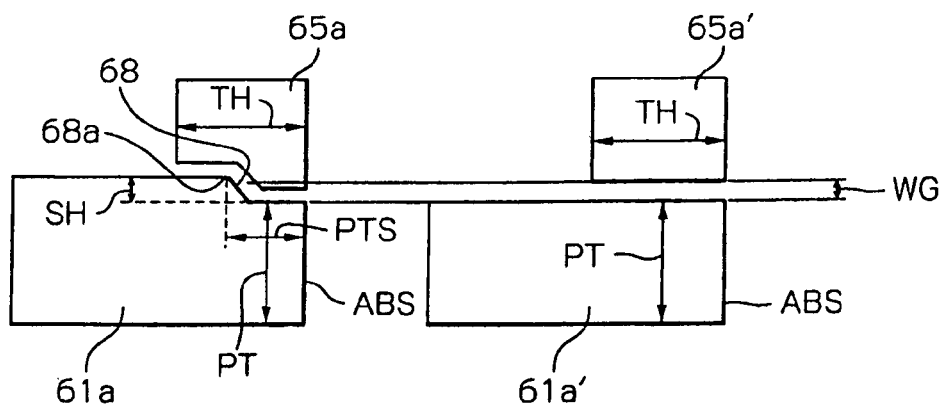
Fig. 9b
Fig. 9c
Prior Art
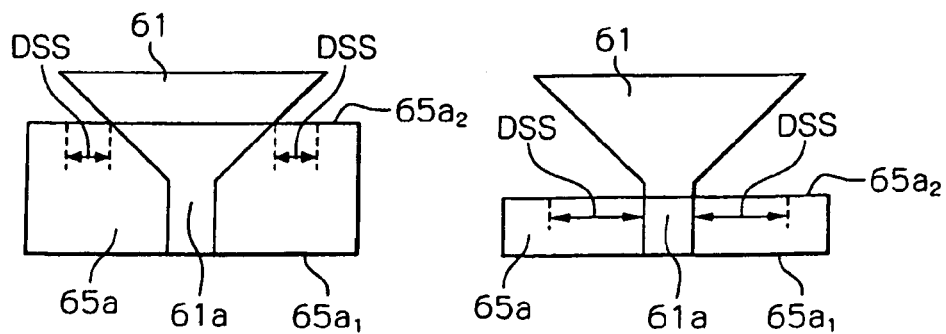
Fig. 9d
Fig. 9e

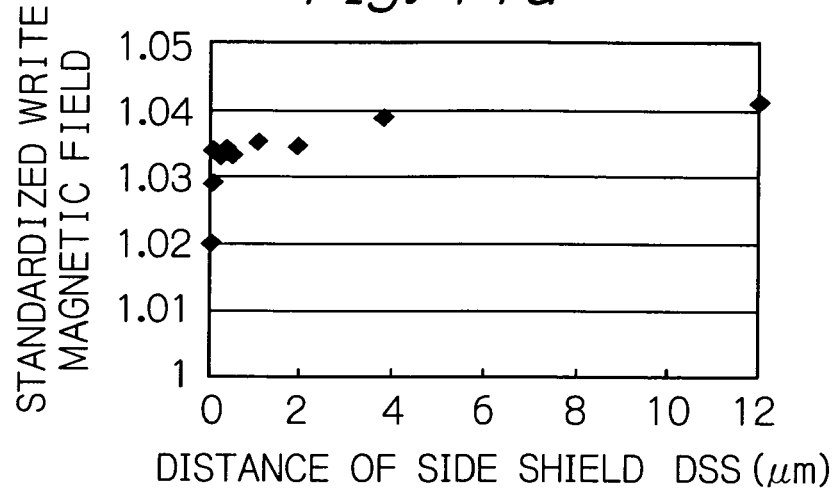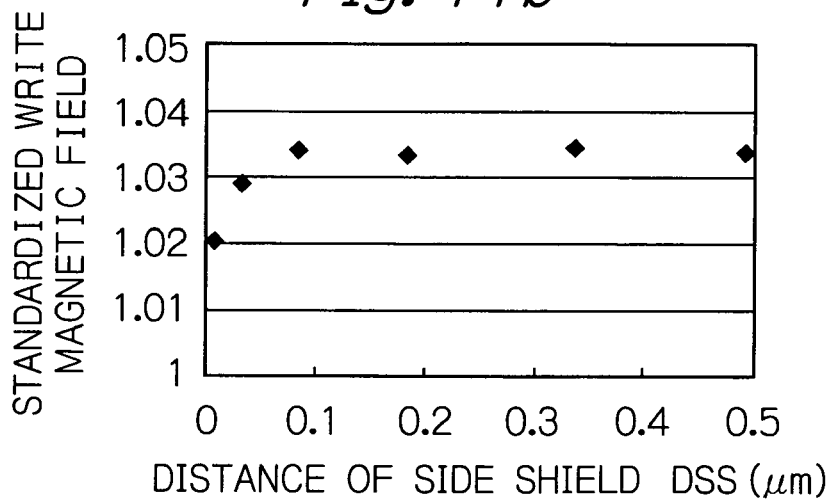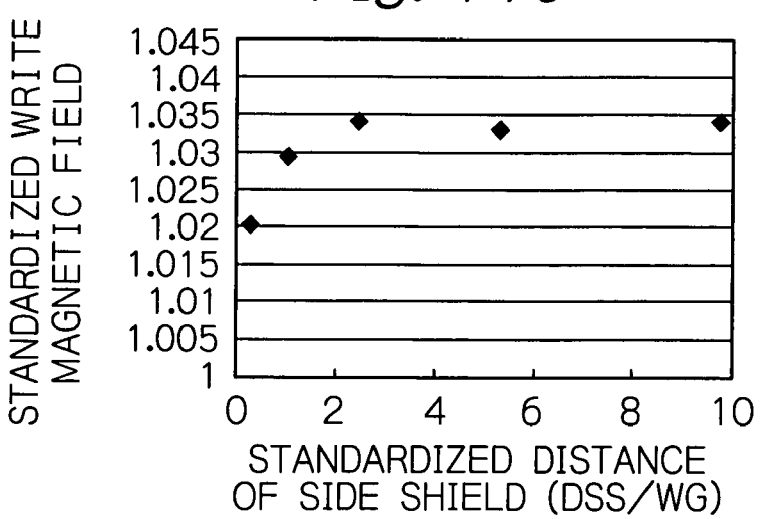

Fig. 18a
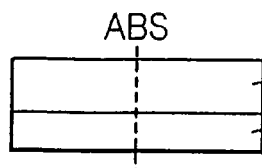
Fig. 18f
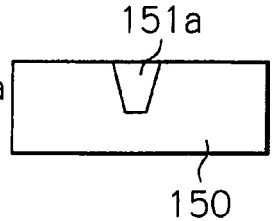
Fig. 18b
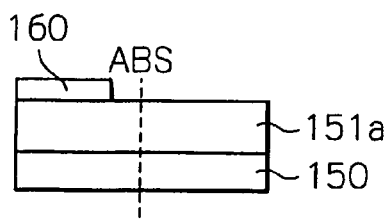
Fig. 18i
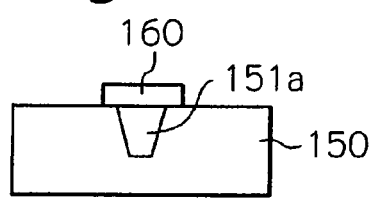
Fig. 18c
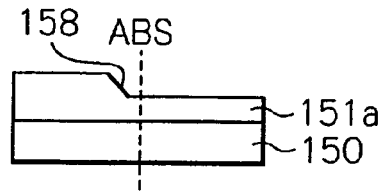
Fig. 18j
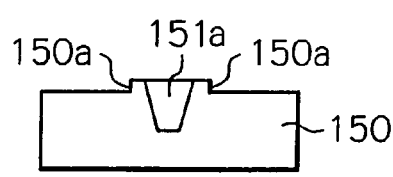
Fig. 18d
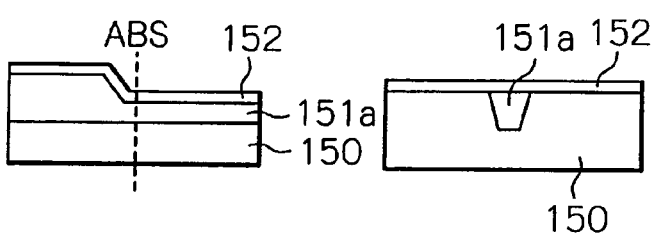
Fig. 18g
Fig. 18k
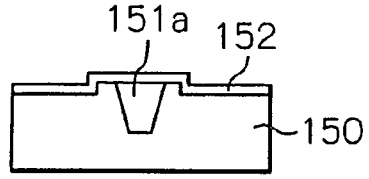
Fig. 18e
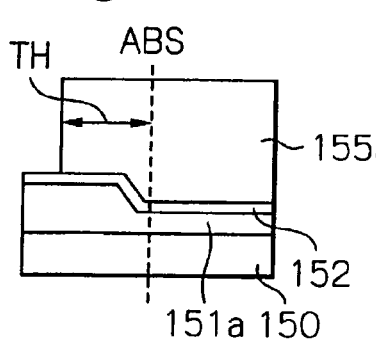
Fig. 18h
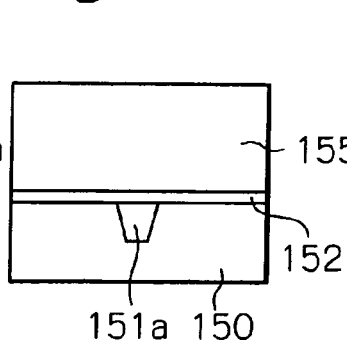
Fig. 18l
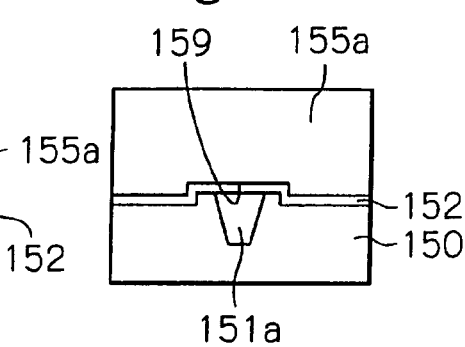

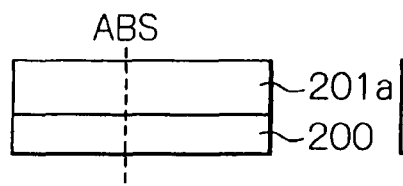
Fig. 24a
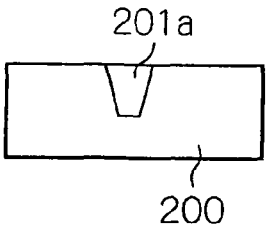
Fig. 24f
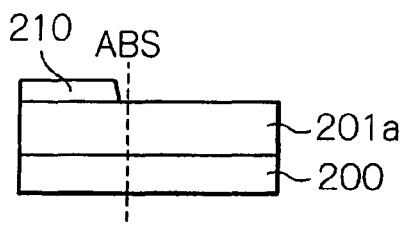
Fig. 24b
Fig. 24i
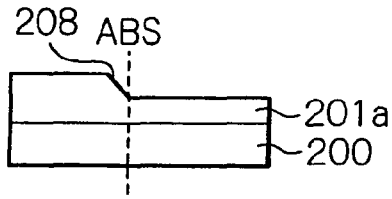
Fig. 24c
Fig. 24j
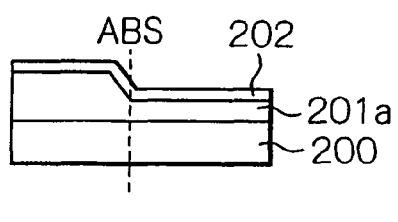
Fig. 24d
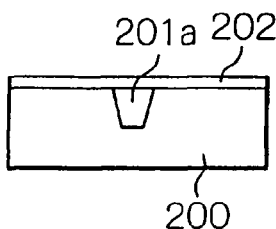
Fig. 24g
Fig. 24k
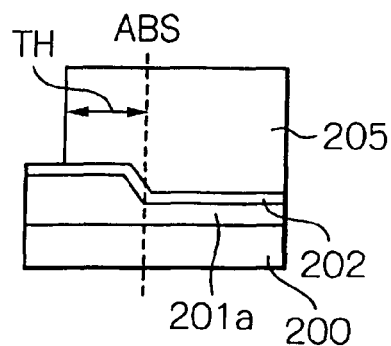
Fig. 24e
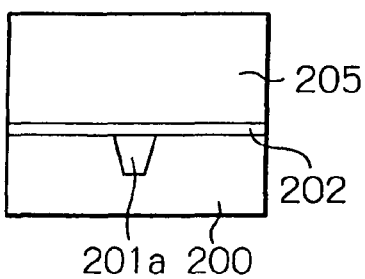
Fig. 24h
Fig. 24l
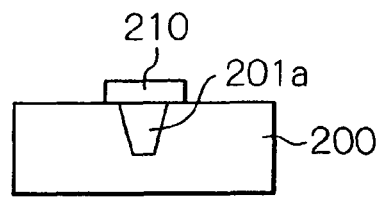
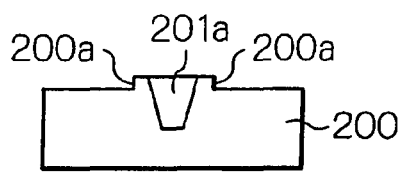
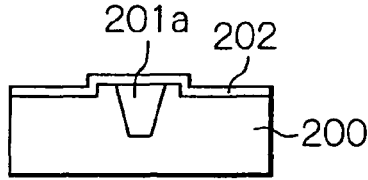
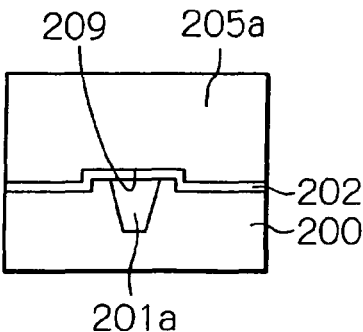

THIN-FILM MAGNETIC HEAD WITH A MAGNETIC POLE HAVING AN INCLINED STEP AT ITS TOP END SECTION SURFACE, MAGNETIC HEAD ASSEMBLY WITH THE THIN-FILM MAGNETIC HEAD, MAGNETIC DISK DRIVE APPARATUS WITH THE MAGNETIC HEAD ASSEMBLY, AND MANUFACTURING METHOD OF THIN-FILM MAGNETIC HEAD

BACKGROUND OF THE INVENTION

1. Field of the Invention

The present invention relates to a thin-film magnetic head with a perpendicular magnetic recording structure, to a magnetic head assembly with the thin-film magnetic head, to a magnetic disk drive apparatus with the magnetic head assembly, and to a manufacturing method of a thin-film magnetic head with a perpendicular magnetic recording structure.

2. Description of the Related Art

There are two types of thin-film magnetic heads, thin-film magnetic heads with a horizontal or in-plane magnetic recording structure used for recording magnetic information by using magnetic fields parallel to a recording medium plane and thin-film magnetic heads with a perpendicular magnetic recording structure used for recording magnetic information by using magnetic fields perpendicular to a recording medium plane. The latter perpendicular magnetic recording type thin-film magnetic heads hold great promise because they can provide stably high recording density.

The perpendicular magnetic recording type thin-film magnetic head has, near its surface facing a magnetic recording medium, a multi-layered structure with a main pole layer, an auxiliary pole layer forming a return-path of magnetic field, and a nonmagnetic gap layer sandwiched between the main pole layer and the auxiliary pole layer. The main pole layer and the auxiliary pole layer are magnetically coupled with each other at a back position in a height direction that is in a direction back away perpendicularly from an air-bearing surface (ABS). A write coil layer is embedded in a nonmagnetic insulation layer surrounded by a magnetic path loop of the main pole layer and the auxiliary pole layer. A write magnetic field produced by feeding current through the write coil layer is perpendicularly applied from a top end of the main pole layer to a perpendicular magnetic recording layer of the recording medium, passed through a soft magnetic backing layer of the recording medium, and then returned to the auxiliary pole layer. Thus, perpendicular magnetic recording to the recording medium is performed at the position opposed to the main pole layer.

In some such perpendicular magnetic recording type thin-film magnetic heads, in order to increase the write magnetic field contributing to magnetic recording, a step or a two-level portion with a slope inclined with respect to a lamination plane is formed on each surface of the main pole layer and the auxiliary pole layer opposed to each other near the ABS.

By forming such step, the write magnetic field component toward a magnetic recording medium is increased but the diffused magnetic field component toward the track-width direction is also increased. The latter lateral magnetic field component may cause adjacent track erasing (ATE) phenomenon that will erase recorded magnetic information on the adjacent tracks to occur.

U.S. Pat. No. 4,656,546 discloses a vertical magnetic recording arrangement with a downstream magnetic shield or a side shield that is formed at a tip of a write pole near its side section in the track-width direction to be exposed to the ABS in order to absorb fringing flux. By forming this side shield, although it is not a problem of inducing ATE phenomenon, a problem of inverting information already recorded on the same track on a magnetic medium can be prevented from occurring.

However, the side shield disclosed in U.S. Pat. No. 4,656,546 greatly decreases the write magnetic field itself. Also, forming of such side shield requires an additional manufacturing process causing the fabrication method to complicate.

SUMMARY OF THE INVENTION

It is therefore an object of the present invention to provide a thin-film magnetic head with a perpendicular magnetic recording structure, a magnetic head assembly with the thin-film magnetic head, a magnetic disk drive apparatus with the magnetic head assembly, and a manufacturing method of a thin-film magnetic head with a perpendicular magnetic recording structure, whereby fringing magnetic field can be reduced without reducing the write magnetic field itself.

Another object of the present invention is to provide a thin-film magnetic head with a perpendicular magnetic recording structure, a magnetic head assembly with the thin-film magnetic head, a magnetic disk drive apparatus with the magnetic head assembly, and a manufacturing method of a thin-film magnetic head with a perpendicular magnetic recording structure, whereby both easy manufacturing of the thin-film magnetic head and reduction of fringing magnetic field can be attained.

According to the invention, a thin-film magnetic head with a perpendicular magnetic recording structure includes a main pole layer, a nonmagnetic gap layer, and an auxiliary pole layer facing the main pole layer via the nonmagnetic gap layer. A surface of a top end section of the main pole layer has an inclined step that slopes from a lamination plane of the layers. The surface faces a top end section of the auxiliary pole layer. The top end section of the auxiliary pole layer has side shield sections at a position that is not exposed to an ABS. The side shield sections faces at least part of side surfaces in a track-width direction, of the main pole layer so as to cover at least part of the inclined step.

Since the side shield sections are formed at the position not exposed to the ABS, a possible fringing magnetic field can be reduced without decreasing the write magnetic field. As a result, the write magnetic field can be increased without inducing ATE phenomenon. Also, since such side shield sections can be formed by only modifying a shape of a resist pattern when forming the inclined step of the main pole layer, the manufacturing process never become complicated.

It is preferred that the inclined step is formed at a position exposed or not exposed to the ABS.

It is also preferred that the top end section of the auxiliary pole layer has, on its bottom section, a recess for covering a part of the main pole layer. Sidewalls of the recess constitute the side shield sections.

It is further preferred that the side shield sections formed along a height direction from the inclined step. The height direction is a direction leaving from and perpendicular to the ABS.

It is still further preferred that a distance between the side surface in a track-width direction, of the top end section of the main pole layer and the side shield section is 4 μm or less. More preferably, a distance between the side surface in a track-width direction, of the top end section of the main pole layer and the side shield section is less than 0.2 μm or less than five times of a gap width of the nonmagnetic gap layer.

It is further preferred that the thin-film magnetic head includes an inductive write head element having the main pole layer, the nonmagnetic gap layer and the auxiliary pole layer, and a magnetoresistive effect (MR) read head element.

According to the present invention, also, a magnetic head assembly has the aforementioned thin-film magnetic head with a perpendicular magnetic recording structure, and a support member for supporting the thin-film magnetic head. Here, the magnetic head assembly means an assembly mechanically and electrically assembling a thin-film magnetic head or a magnetic head slider having a write head element and a read head element with its support member. More concretely, an assembly of a magnetic head slider and a suspension is in general called as a head gimbal assembly (HGA), an assembly of a magnetic head slider, a suspension and a support arm for supporting the suspension is in general called as a head arm assembly (HAA), and an assembly stacking a plurality of HAAs is in general called as a head stack assembly (HSA).

According to the present invention, further, a magnetic disk drive apparatus has at least one magnetic disk, at least one aforementioned thin-film magnetic head with a perpendicular magnetic recording structure, and at least one support member for supporting the at least one thin-film magnetic head.

According to the present invention, still further, a manufacturing method of a thin-film magnetic head with a perpendicular magnetic recording structure, includes a step of forming a main pole layer on an insulation layer, a step of forming a convex portion with sloped side surfaces on top end sections of the main pole layer and the insulation layer at a position not exposed to an ABS, by milling through a mask a part of the top end sections of the main pole layer and the insulation layer, a step of forming a nonmagnetic gap layer on the main pole layer and the insulation layer with the formed convex portion, and a step of forming on the nonmagnetic gap layer an auxiliary pole layer with a top end section that faces the main pole layer and has a recess corresponding to the convex portion.

Since the convex portion side shield sections are formed on top end sections of the main pole layer and the insulation layer, in other words the recess are formed on the auxiliary pole layer, at the position not exposed to the ABS, a possible fringing magnetic field can be reduced without decreasing the write magnetic field. As a result, the write magnetic field can be increased without inducing ATE phenomenon. Also, since such convex portion can be formed by only modifying a shape of a resist pattern when forming the inclined step of the main pole layer, the manufacturing process never become complicated.

It is preferred that the convex portion forming step includes a step of milling the part of the top end sections of the main pole layer and the insulation layer so that a distance between a side surface in a track-width direction, of the top end section of the main pole layer and a side surface of the recess is 4 μm or less. More preferably, the convex portion forming step includes a step of milling the part of the top end sections of the main pole layer and the insulation layer so that a distance between a side surface in a track-width direction, of the top end section of the main pole layer and a side surface of the recess is less than 0.2 μm or less than five times of a gap width of the nonmagnetic gap layer.

It is also preferred that the method includes a step of forming an inductive write head element having the main pole layer, the nonmagnetic gap layer and the auxiliary pole layer after forming an MR read head element.

Further objects and advantages of the present invention will be apparent from the following description of the preferred embodiments of the invention as illustrated in the accompanying drawings.

BRIEF DESCRIPTION OF THE DRAWINGS

FIG. 8 is a perspective view illustrating only a bottom structure of the pedestal section of the auxiliary pole layer, seen from the bottom;

FIGS. 9a to 9e are views illustrating configurations in simulations;

FIGS. 11a to 11c are graphs illustrating the results of simulations with respect to write magnetic field;

FIGS. 18a to 18l are process side views and process sectional views illustrating the fabrication process of the main pole layer and the auxiliary pole layer in this composite thin-film magnetic head;

FIGS. 24a to 24l are process side views and process sectional views illustrating the fabrication process of the main pole layer and the auxiliary pole layer in this composite thin-film magnetic head.

DESCRIPTION OF THE PREFERRED EMBODIMENTS

Figure 1:
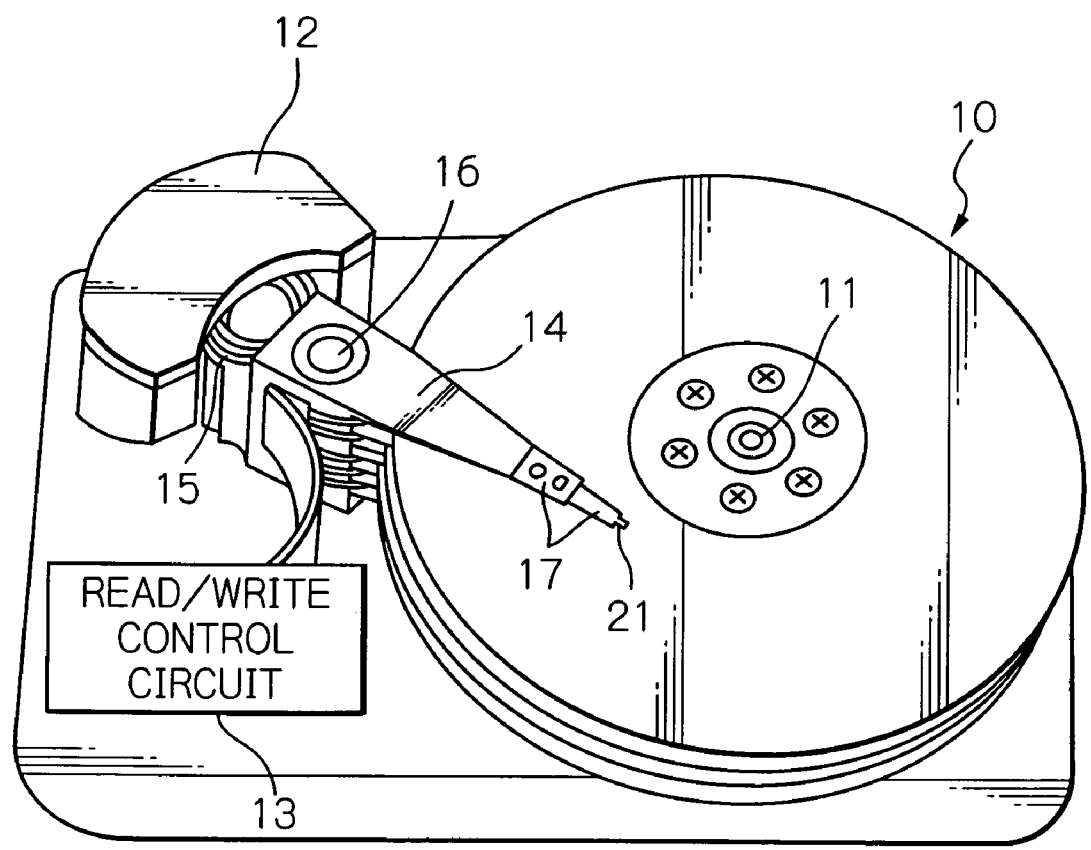
FIG. 1 is a perspective view schematically illustrating a main structure of a magnetic disk drive apparatus as an embodiment according to the present invention.
Figure 2:
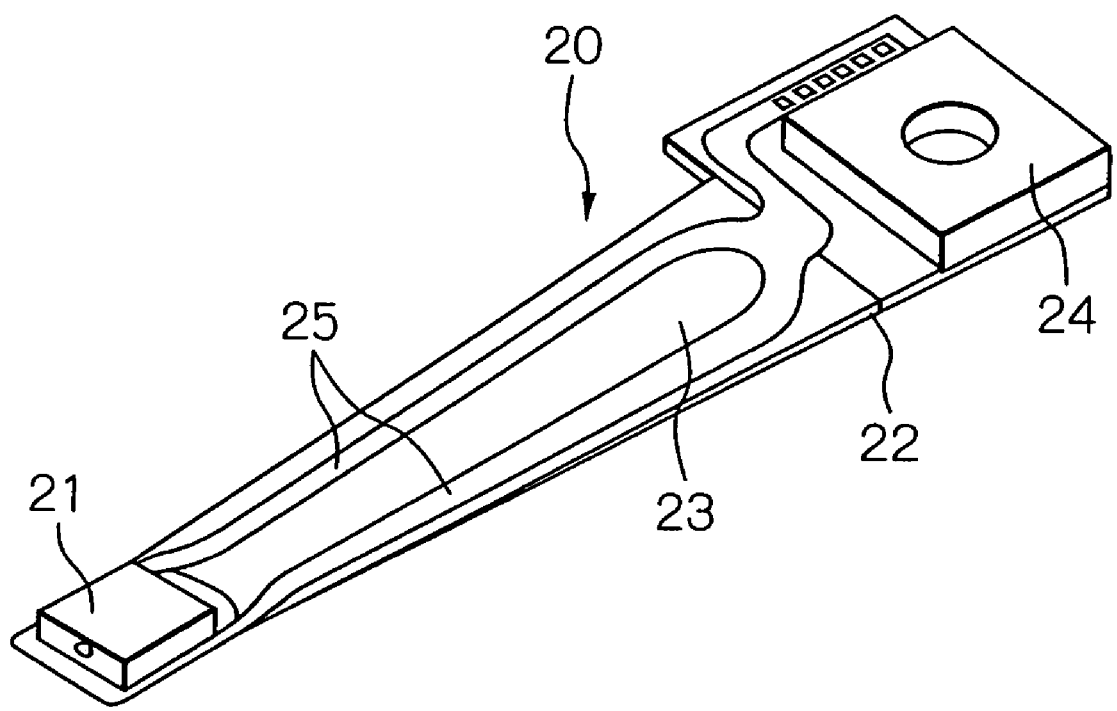
FIG. 2 is a perspective view illustrating an example of the structure of a head gimbal assembly (HGA) shown in FIG. 1.
Figure 3:
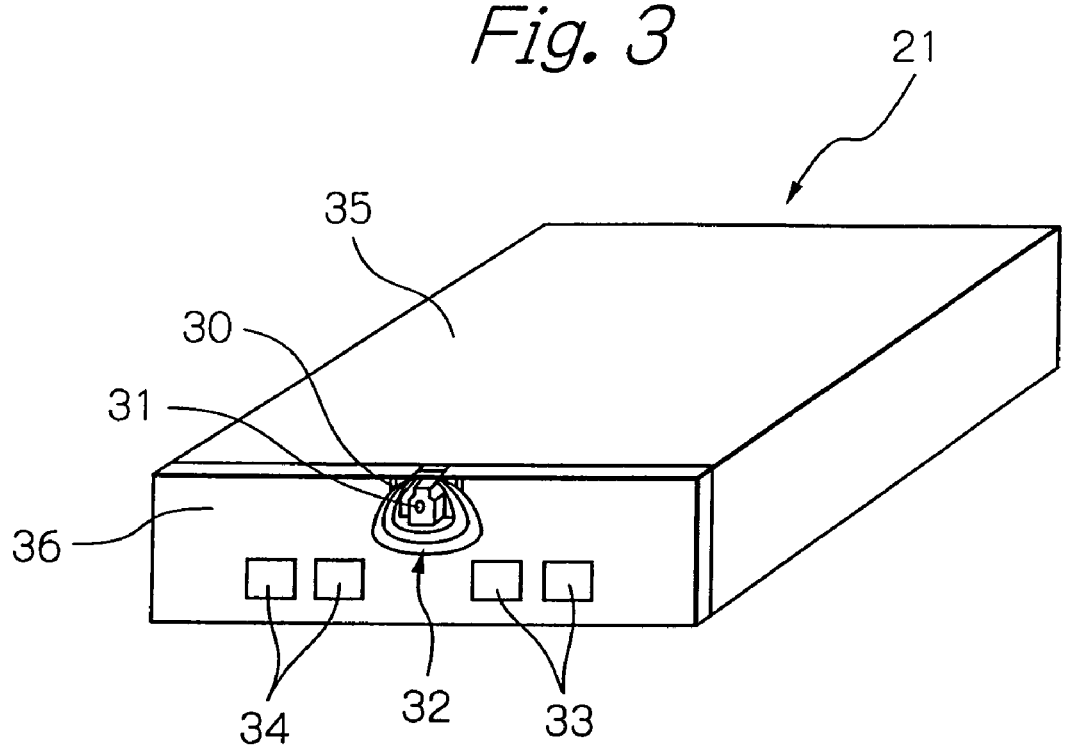
FIG. 3 is a perspective view illustrating a composite thin-film magnetic head mounted at the end of the HGA of FIG. 2.
Figure 4:
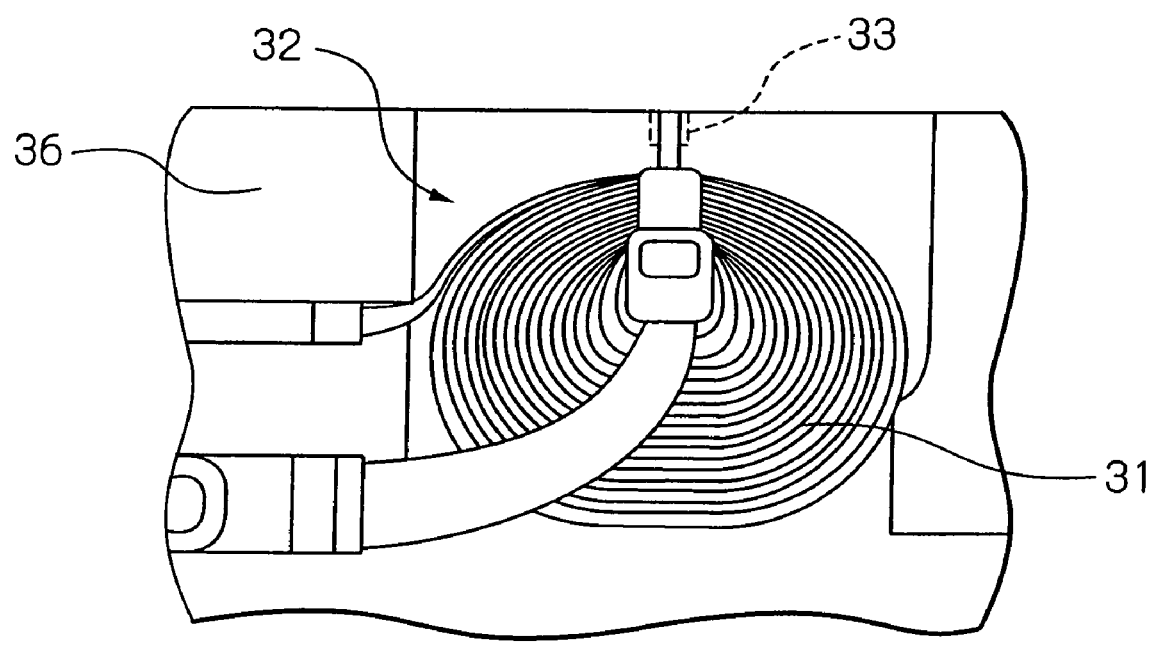
FIG. 4 is a plane view illustrating a magnetic head part of the composite thin-film magnetic head of FIG. 3, when viewed from an element forming surface side of a slider substrate.

FIG. 1 schematically illustrates the main structure of a magnetic disk drive apparatus according to an embodiment of the present invention. FIG. 2 illustrates an example of the structure of an HGA of FIG. 1. FIG. 3 illustrates the composite thin-film magnetic head mounted at the end of the HGA of FIG. 2. FIG. 4 illustrates the magnetic head element part of the composite thin-film magnetic head of FIG. 3, when viewed from an element forming surface side of a slider substrate.

In FIG. 1, a reference numeral 10 denotes a plurality of magnetic disks that rotates about a rotary axis of a spindle motor 11, 12 denotes an assembly carriage device for positioning the composite thin-film magnetic head or magnetic head slider on the track, and 13 denotes a read/write control circuit for controlling the read/write operation of the thin-film magnetic head, respectively.

The assembly carriage device 12 includes a plurality of drive arms 14. The drive arms 14 are swingable about a pivot-bearing axis 16 by a voice coil motor (VCM) 15, and are stacked in a direction along this axis 16. Each of the drive arms 14 has an HGA 17 mounted at the end thereof. The HGA 17 includes a magnetic head slider 12 facing the surface of each magnetic disk 10. In modifications, the magnetic disk drive apparatus may include only a single magnetic disk 10, drive arm 14 and HGA 17.

As shown in FIG. 2, in the HGA, the magnetic head slider 21 is fixed onto the end of a suspension 20. The magnetic head slider 21 has a tunnel magnetoresistive effect (TMR) read head element and an inductive write head element. Further, in the HGA, terminal electrodes of the magnetic head slider 21 are electrically connected to an end of a wiring member 25.

The suspension 20 includes mainly a load beam 22, a flexure 23, a base plate 24 and the wiring member 25. The load beam 22 generates a load to be applied to the magnetic head slider 21. The flexure 23 having elasticity is fixed onto and supported by the load beam 22. The base plate 24 is arranged on the base of the load beam 22. The wiring member 25 is arranged on the flexure 23 and the load beam 22, and includes lead conductors and connection pads electrically connected to both ends of the lead conductors.

It is obvious that the structure of the suspension according to the present invention is not limited to the above.

As shown in FIGS. 3 and 4, the magnetic head slider 21 of this embodiment includes a composite thin-film magnetic head 32 and four signal terminal electrodes 33 and 34, on an element formed surface 36 that is one side surface when an ABS 35 of the magnetic head slider serves as the bottom surface. The composite thin-film magnetic head 32 includes a TMR read head element 30 and an inductive write head element 31 that are mutually stacked. The four signal terminal electrodes 33 and 34 are connected to the TMR read head element 30 and the inductive write head element 31, respectively. The positions of these terminal electrodes are not limited to those shown in FIG. 3.

Figure 5A:
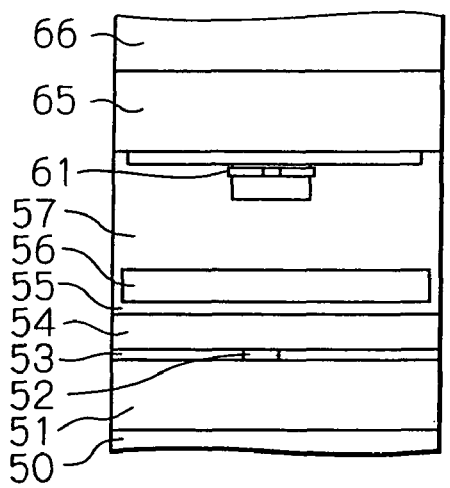
FIGS. 5a and 5b are a side view and a central cross sectional view schematically illustrating the structure of the composite thin-film magnetic head of FIG. 3, respectively.
Figure 5B:
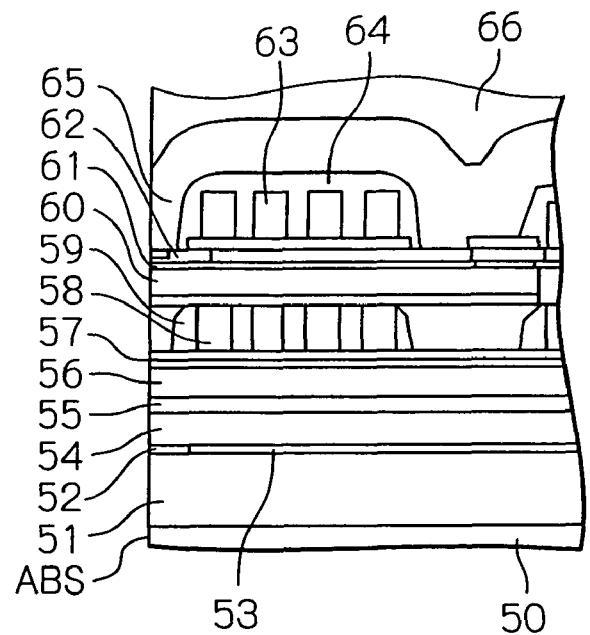
Figure 6:
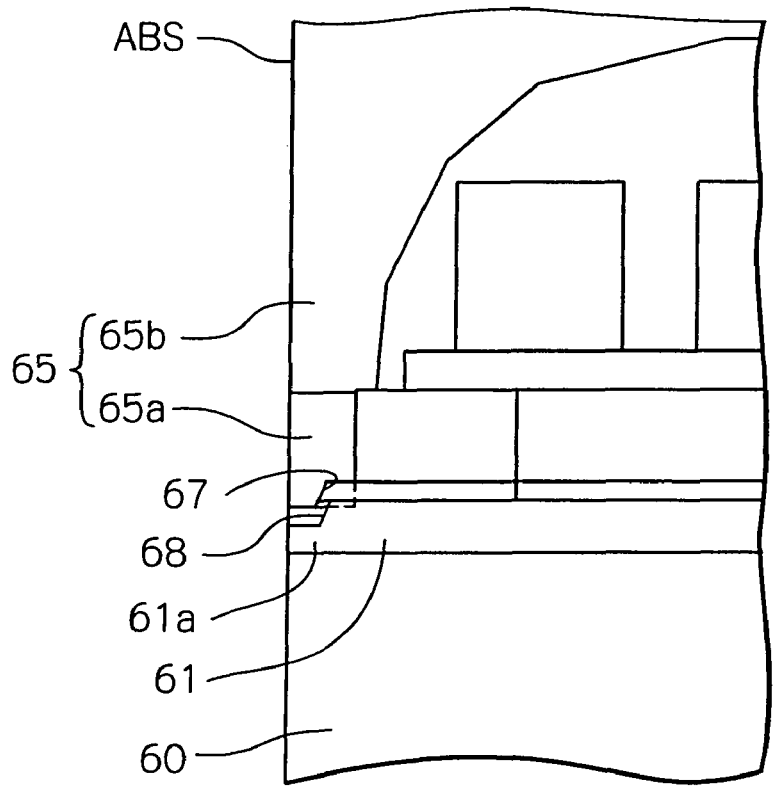
FIG. 6 is an enlarged cross sectional view schematically illustrating an ABS side top end section of an inductive write head element in FIG. 5b.

FIGS. 5a and 5b schematically illustrate the structure of the composite thin-film magnetic head of FIG. 3, and FIG. 6 illustrates in close up an ABS side top end section of the inductive write head element in FIG. 5b. FIGS. 5b and 6 indicate a cross-section along a plane perpendicular to the ABS of the composite thin-film magnetic head and perpendicular to the track-width direction. In this embodiment, the MR read head element consists of a TMR read head element. However, in modification, the MR read head element may be a current perpendicular to plane (CPP) type giant magnetoresistive effect (GMR) read head element.

In FIGS. 5a and 5b, reference numeral 50 denotes an under insulation layer stacked on a wafer or substrate (not shown), 51 denotes a lower electrode layer which serves also as a lower shield layer (SF), 52 denotes a TMR multi-layered structure stacked on the lower electrode layer 51, 53 denotes an insulation layer stacked also on the lower electrode layer 51, and 54 denotes an upper electrode layer which serves also as a upper shield layer (SS1), stacked on the TMR multi-layered structure 52 and the insulation layer 53, respectively. The TMR read head element is basically composed of the under insulation layer 50, the lower electrode layer 51, the TMR multi-layer 52, the insulation layer 53 and the upper electrode layer 54.

On the TMR read head element, an insulation layer 55 and a soft magnetic layer 56 are stacked. On the soft magnetic layer 56, the inductive write head element with a perpendicular magnetic recording structure is formed.

The inductive write head element is basically composed of an insulation layer 57, a backing coil layer 58, a backing coil insulation layer 59, an insulation layer 60, a main pole layer 61, a nonmagnetic gap layer 62, a write coil layer 63, a write coil insulation layer 64 and an auxiliary pole layer 65. On the auxiliary pole layer 65, a protection layer 66 is stacked.

As shown in FIG. 6, the auxiliary pole layer 65 has a pedestal section 65a formed at its ABS side top end portion, and a return yoke section 65b magnetically connected with this pedestal section 65a. The pedestal section 65a of the auxiliary pole layer 65 and a top end section 61a of the main pole layer 61 are faced each other via the nonmagnetic gap layer 62. The facing surfaces of the pedestal section 65a and the top end section 61a have inclined step or two-level portions 67 and 68 with slopes inclined with respect to a lamination plane at retracted positions in a height direction from the ABS, that is, at positions not exposed to the ABS, respectively, as shown in FIG. 6. By forming such inclined steps 67 and 68, it is possible to increase write magnetic field toward a magnetic recording medium.

Figure 7A:
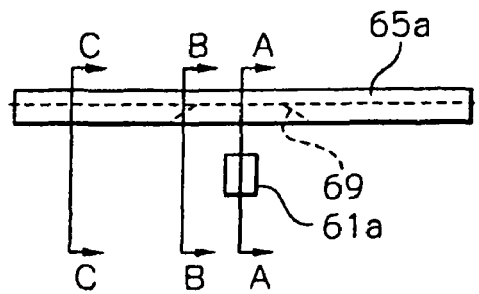
FIGS. 7a, 7b and 7c are views illustrating structures of a pedestal section of an auxiliary pole layer and a top end section of a main pole layer.
Figure 7B:
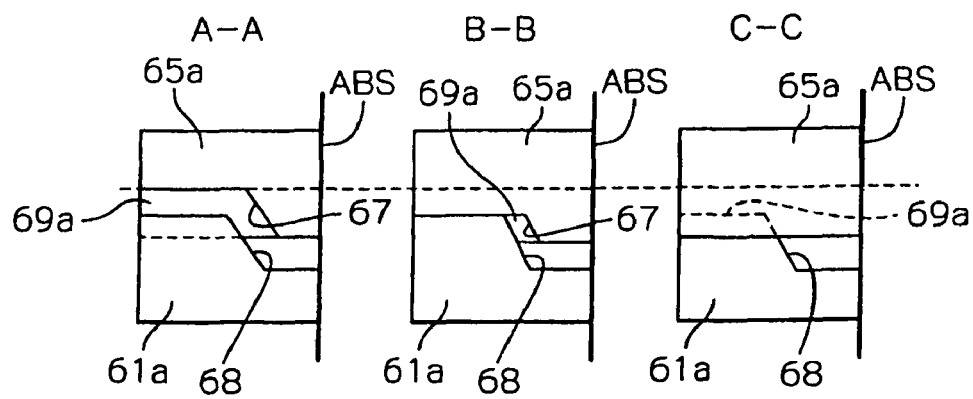
Figure 7C:
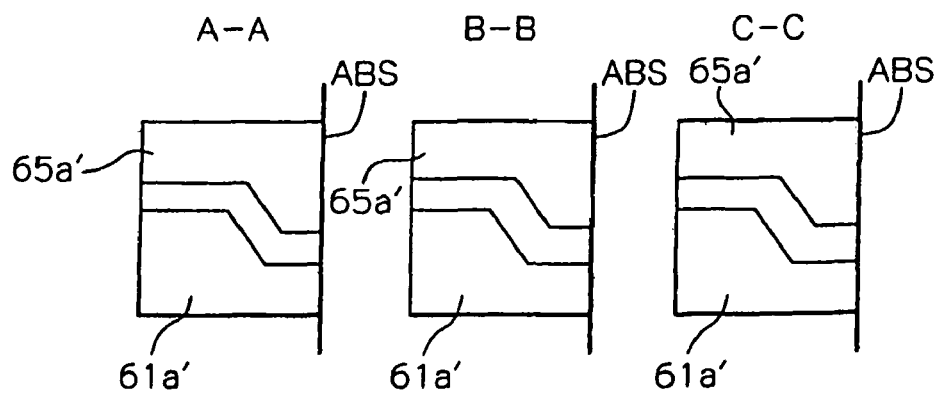

FIGS. 7a, 7b and 7c illustrate structures of the pedestal section 65a of the auxiliary pole layer 65 and the top end section 61a of the main pole layer 61. Particularly, FIG. 7a indicates positions of cross-sections A-A, B-B and C-C, FIG. 7b indicates structures of these facing surfaces in this embodiment at the cross-sections A-A, B-B and C-C, and FIG. 7c indicates structures of these facing surfaces in the conventional art at the cross-sections A-A, B-B and C-C. It should be noted that FIGS. 7b and 7c are illustrated such that the positions of the ABSs are inverted from these of FIGS. 5 and 6.

FIG. 8 illustrates a bottom structure of the pedestal section 65a of the auxiliary pole layer 65, seen from the bottom or the opposite direction.

As will be noted from FIGS. 7a and 7b and FIG. 8, the thin-film magnetic head in this embodiment has, on the bottom surface $65a_3$ of the pedestal section 65a of the auxiliary pole layer 65, a recess 69 running along the height direction from the inclined step 67. Both sidewalls of the recess 69 constitute side shield sections 69a. These side shield sections 69a face parts of side faces in the track-width direction, of the top end section 61a of the main pole layer 61. The recess 69 is formed on the bottom surface $65a_3$ of the pedestal section 65a along the height direction from the inclined step 67 and as shown in FIG. 7b lies over or covers a part of the top end section 61a of the main pole layer 61. Since the recess 69 therefore the side shield sections 69a are formed at the position not exposed to the ABS, a possible fringing magnetic field can be reduced without decreasing the write magnetic field. As a result, the write magnetic field can be increased without inducing ATE phenomenon.

Also, since such side shield sections 69a can be formed as will be mentioned later by only modifying the shape of a resist pattern when forming the inclined step 67, the manufacturing process never become complicated. In other words, it is possible to quite easily fabricate such side shield sections.

How much write magnetic field and ATE magnetic field occur depending upon a side shield distance DSS was checked by performing simulations. Hereinafter, contents and result of the simulations will be described in detail.

FIGS. 9a to 9e illustrate configurations of the simulations.

FIG. 9a indicates the pedestal section 65a of the auxiliary pole layer 65 and the top end section 61a of the main pole layer 61 by a plane view seen from the ABS side. As shown in the figure, a width PWTH, in the track-width direction, of an ABS-exposed end face of the top end section 61a of the main pole layer 61 is determined as PWTH=0.09 μm, a length PT, in the height direction, of the ABS-exposed end face is determined as PT=0.27 μm, and a write gap width WG, which is a distance on the ABS-exposed end face between the pedestal section 65a of the auxiliary pole layer 65 and the top end section 61a of the main pole layer 61 is determined as WG=0.035 μm.

FIG. 9b indicates the pedestal section 65a of the auxiliary pole layer and the top end section 61a of the main pole layer, with a inclined step according to the aforementioned embodiment, by a central sectional view cut by a plane perpendicular to the track-width direction. As shown in the figure, a throat height TH, which is a length of the pedestal section 65a along the height direction is determined as TH=0.25 μm, a distance PTS between a top end 68a of the inclined step 68 of the top end section 61a of the main pole layer and the ABS is determined as PTS=0.12 μm, and a slope height SH, which is a height of the inclined step 68 of the top end section 61a of the main pole layer is determined as SH=0.05 μm.

FIG. 9c indicates the pedestal section 65a' of the auxiliary pole layer with no inclined step according to the conventional art and the top end section 61a of the main pole layer by a central sectional view cut by a plane perpendicular to the track-width direction. The width PWTH in the track-width direction, the length PT in the height direction, the throat height TH and the write gap width WG are the same as those in the embodiment shown in FIGS. 9a and 9b.

FIGS. 9d and 9e indicate the pedestal section 65a of the auxiliary pole layer and the top end section 61a of the main pole layer in two examples according to the embodiment by a plane view. As shown in these figures, the side shield distance DSS (μm) is a distance on the end face $65a_2$ (face opposite to the ABS side face $65a_1$) of the pedestal section 65a between a side end edge of the top end section 61a of the main pole layer and a side end edge of the side shield section 69a.

Figure 10A:
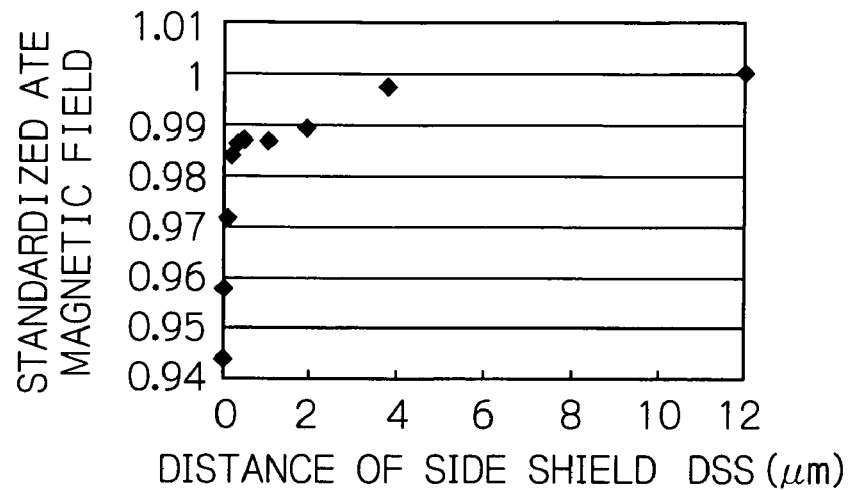
FIGS. 10a to 10c are graphs illustrating the results of simulations with respect to ATE magnetic field.
Figure 10B:
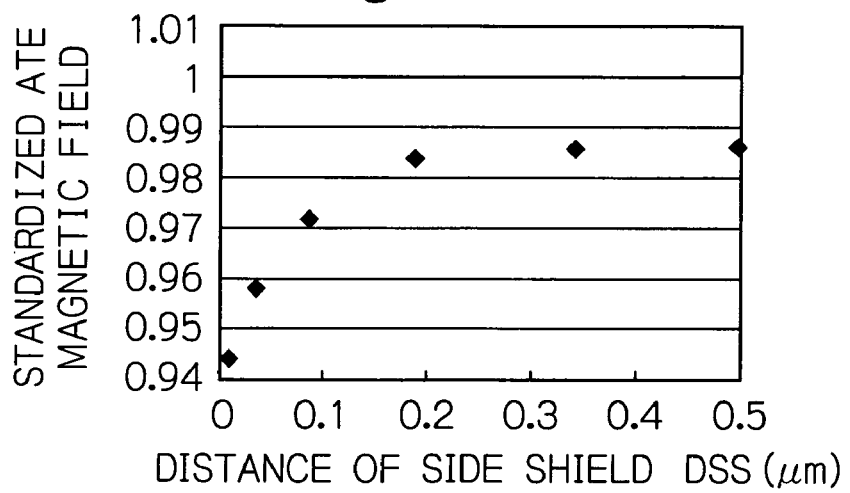
Figure 10C:
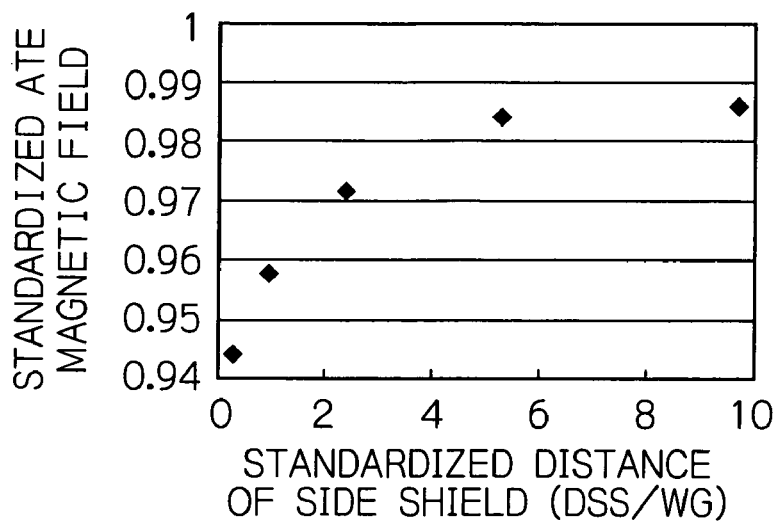

FIGS. 10a to 10c and FIGS. 11a to 11c illustrate the results of the simulations. FIGS. 10a to 10c show the results with respect to ATE magnetic field, and FIGS. 11a to 11c show the results with respect to write magnetic field.

FIG. 10b indicates, by enlarging scale of the lateral axis of FIG. 10a, the ATE magnetic field when the side shield distance DSS is 0.5 μm or less. FIG. 10c indicates the ATE magnetic field when the side shield distance DSS of the lateral axis is standardized to the write gap width WG. In these figures, the ATE magnetic field of the longitudinal axis represents a standardized effective magnetic field at a position offset in the track-width direction with a length that corresponds to a write width defined for a coercivity Hc of 5 kOe of a recording medium. The standardized effective magnetic field is obtained by standardizing an effective magnetic field Heff to its value at a position of the side shield distance DSS of 12 μm. The effective magnetic filed Heff is obtained from Heff=$(H//^{2/3}+H\perp^{2/3})^{3/2}$, where H// is a magnetic field parallel to the recording medium surface and ⊥ is a magnetic field perpendicular to the recording medium surface.

As will be noted from FIG. 10a, if the side shield distance DSS becomes 4 λm or less, the ATE magnetic field decreases. Particularly, as shown in FIGS. 10b and 10c, the ATE magnetic field suddenly decreases when the side shield distance DSS becomes lower than 0.2 μm or lower than five times of the write gap width WG.

FIG. 11b indicates, by enlarging scale of the lateral axis of FIG. 11a, the write magnetic field when the side shield distance DSS is 0.5 μm or less. FIG. 11c indicates the write magnetic field when the side shield distance DSS of the lateral axis is standardized to the write gap width WG. In these figures, the write magnetic field of the longitudinal axis represents a standardized effective magnetic field obtained by standardizing an effective magnetic field Heff to a write magnetic field from a structure in which the slope height SH is zero, namely a write magnetic field from a structure as shown in FIG. 9c.

As will be noted from FIGS. 11a to 11c, even if the side shield distance DSS is shortened to 0.01 μm, the standardized write magnetic field of 1 or more, which is higher ability in writing than that when the slope height SH is zero, can be obtained. Therefore, when the side shield distance DSS is more than zero, the ability in writing will not be decreased than that when the slope height SH is zero.

As a result of the simulations, it is understood that the ATE magnetic field can be reduced without adversely affecting the write magnetic field if the side shield distance DSS is set to 4 μm or less, desirably lower than 0.2 μm, or lower than five times of the write gap width WG.

Next, a fabrication process of the composite thin-film magnetic head in this embodiment will be described in detail.

Figure 12:
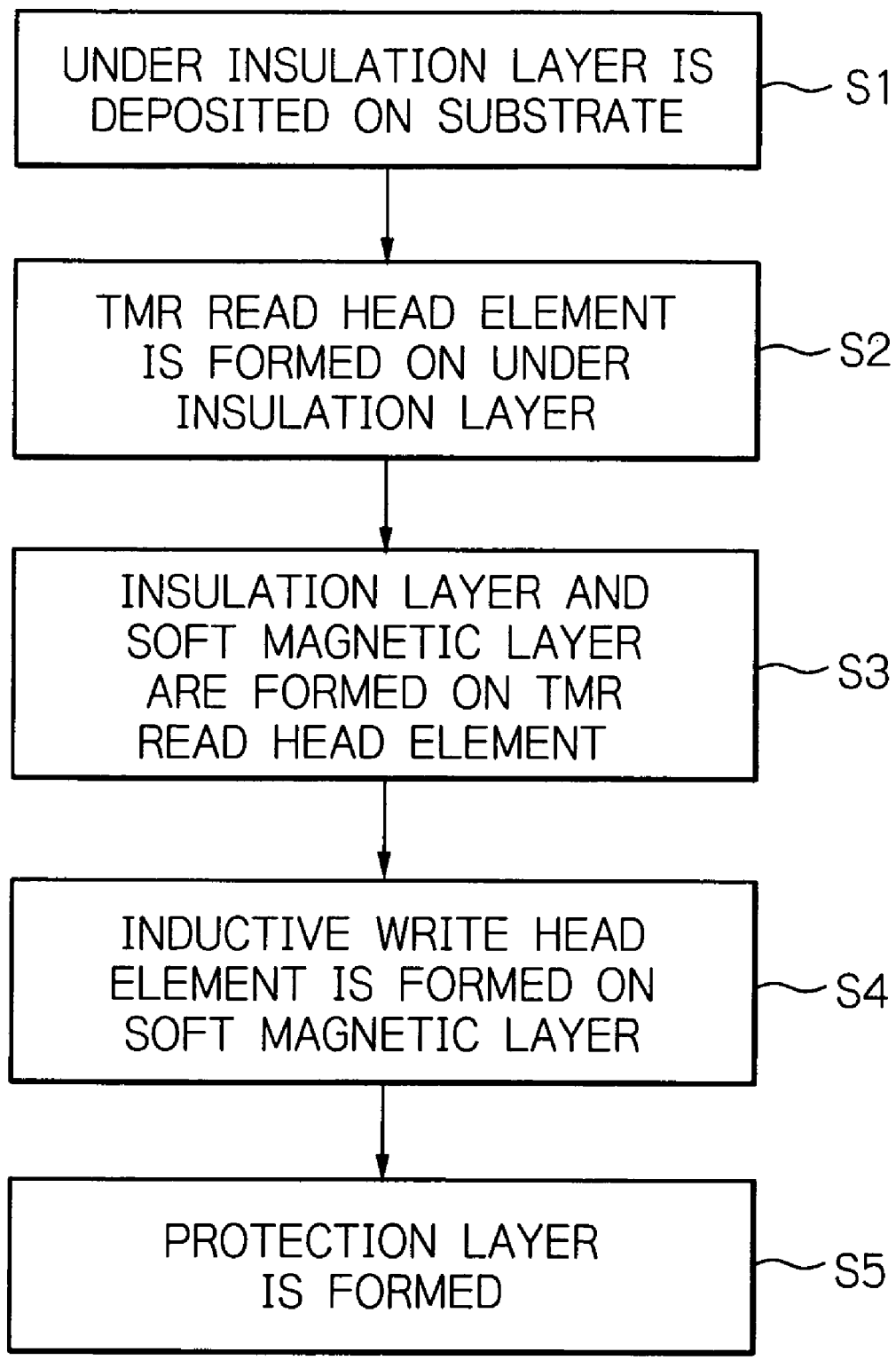
FIG. 12 is a flow chart illustrating an example of a fabrication process of the composite thin-film magnetic head of FIG. 3.

FIG. 12 illustrates an example of the fabrication process of the composite thin-film magnetic head in this embodiment, and FIGS. 13a to 13f and FIGS. 14a to 14l illustrate a fabrication process of the main pole layer and the auxiliary pole layer in this composite thin-film magnetic head. Particularly, FIGS. 13a to 13e indicate plane views of the structure according to this embodiment and FIG. 13f indicates a plane view of the structure according to the conventional art. The process shown in FIG. 13f corresponds to that of FIG. 13b. FIGS. 14a to 14e indicate central section views of the structure seen from a plane that is perpendicular to the track-width direction, FIGS. 14f to 14h indicate sectional views seen from the ABS, and FIGS. 14i to 14l indicate sectional views seen from a plane that is parallel to the ABS and passes through the top end 68a of the inclined step 68.

As shown in FIGS. 12, 5b and 6, first, a substrate made of a conductive material, such as AlTiC, Al$_2$O$_3$—TiC is prepared and an under insulation layer 50 is deposited on the substrate by sputtering for example (Step S1). This layer 50 is made of an insulating material, such as alumina (Al$_2$O$_3$) or silicon oxide (SiO$_2$), with a thickness of about 0.05 to 10 μm.

Then, on the under insulation layer 50, a TMR read head element including a lower electrode layer that serves also as a lower shield layer (SF) 51, a TMR multi-layered structure 52, an insulation layer 53 and an upper electrode layer that serves also as an upper shield layer (SS1) 54 is formed (Step S2).

Then, on the TMR read head element, an insulation layer 55 and a soft magnetic layer 56 are formed (Step S3). The insulation layer 55 is formed by for example sputtering or chemical vapor deposition (CVD) of an insulation material such as Al$_2$O$_3$, SiO$_2$, aluminum nitride (AlN) or diamond like carbon (DLC) to have a thickness of about 0.3 μm. The soft magnetic layer 56 is formed by for example frame plating of a magnetic metal material such as nickel iron (NiFe), cobalt iron (CoFe), nickel iron cobalt (NiFeCo), iron aluminum silicon (FeAlSi), iron nitride (FeN), iron zirconium nitride (FeZrN), iron tantalum nitride (FeTaN), cobalt zirconium niobium (CoZrNb) or cobalt zirconium tantalum (CoZrTa) to have a thickness of about 1.0 μm. These insulation layer 55 and the soft magnetic layer 56 function to separate the TMR read head element and an inductive write head element formed thereon.

Thereafter, on the soft magnetic layer 56, an inductive write head element including the insulation layer 57, the backing coil layer 58, the backing coil insulation layer 59, the insulation layer 60, the main pole layer 61, the nonmagnetic gap layer 62, the write coil layer 63, the write coil insulation layer 64 and the auxiliary pole layer 65 is formed (Step S4).

The insulation layer 57 is formed on the soft magnetic layer 56 by for example sputtering of an insulation material such as Al$_2$O$_3$ or SiO$_2$. If necessary, a top surface of the insulation layer 57 is planarized by chemical mechanical polishing (CMP) for example. On the insulation layer 57, the backing coil layer 58 is formed by for example frame plating of a conductive material such as for example copper (Cu) to have a thickness of about 1-5 μm. The backing coil insulation layer 59 is formed to coat the backing coil layer 58 by for example photolithography of a resist material such as thermally cured novolac resist for example to have a thickness of about 0.5-7 μm.

Figure 13A:
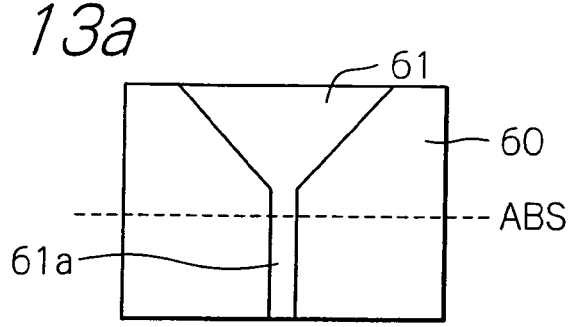
FIGS. 13a to 13f are process plane views illustrating a fabrication process of the main pole layer and the auxiliary pole layer in this composite thin-film magnetic head.
Figure 14A:
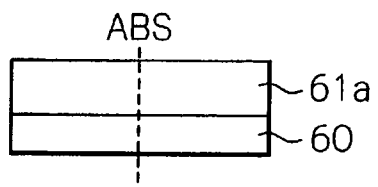
FIGS. 14a to 14l are process side views and process sectional views illustrating the fabrication process of the main pole layer and the auxiliary pole layer in this composite thin-film magnetic head.
Figure 14F:
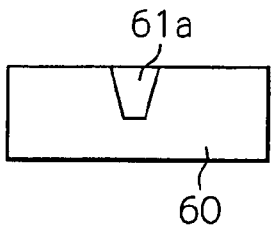

On the backing coil insulation layer 59, formed is the insulation layer 61. The main pole layer 61 is formed on this insulation layer 60. FIGS. 13a, 14a and 14f indicate this state. The main pole layer 61 serves as a magnetic path for leading in convergence magnetic flux induced from the write coil layer 63 to a perpendicular magnetic recording layer of the magnetic disk. Using for example frame plating to have a single layer of a metal material such as for example NiFe, CoFe, NiFeCo, FeAlSi, FeN, FeZrN, FeTaN, CoZrNb or CoZrTa or multi-layers thereof with a thickness of about 0.5-3 μm forms this main pole layer 61.

Figure 13B:
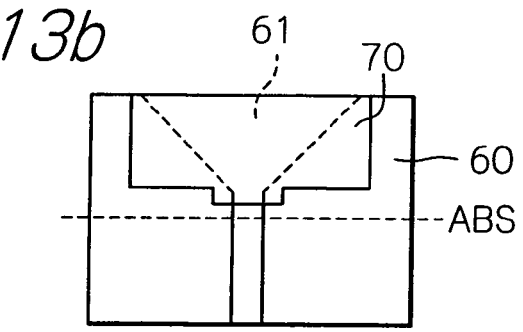
Figure 13F:
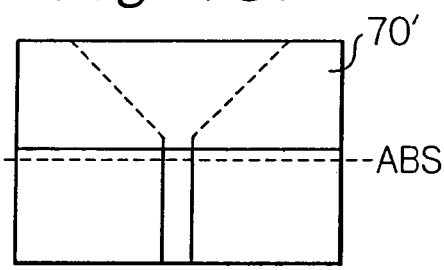
Figure 14B:
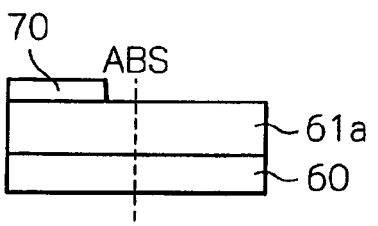
Figure 14I:
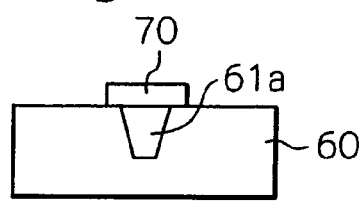

After forming the main pole layer 61, a resist pattern 70 with a convex plane shape as shown in FIGS. 13b, 14b and 14i is formed on the main pole layer 61 and the insulation layer 60. This resist pattern 70 has a pattern shape of the convex plane shape, that is, a pattern shape corresponding to the inclined steps 68 and 67 formed on the main pole layer 61 and the auxiliary pole layer 65 and also to the recess 69 formed on the auxiliary pole layer 65. It should be noted that, in the conventional art, a resist pattern 70' shown in FIG. 13f was formed.

Figure 13C:
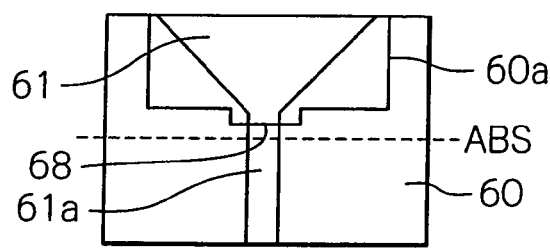
Figure 13D:
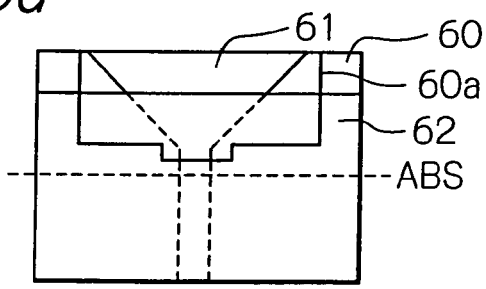
Figure 13E:
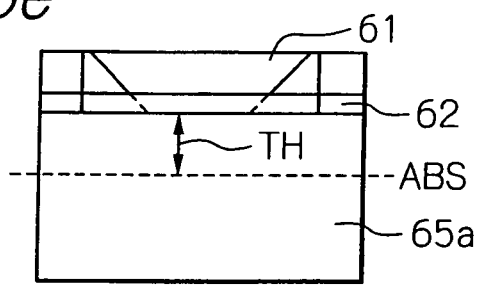
Figure 14C:
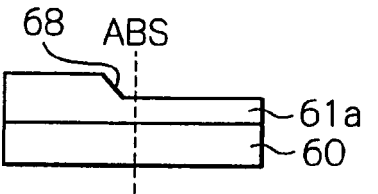
Figure 14J:
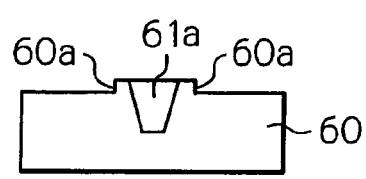
Figure 14D:
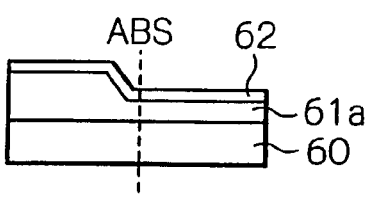
Figure 14G:
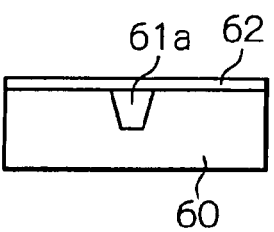
Figure 14K:
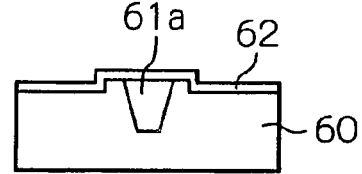
Figure 14E:
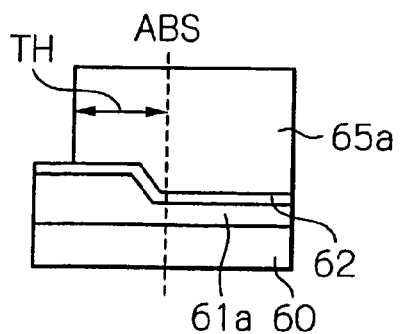
Figure 14H:
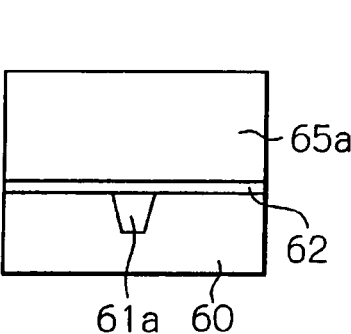

By performing an ion milling through the resist pattern 70, the main pole layer 61 and the insulation layer 60 with no resist pattern 70 are etched or dug to form the inclined step 68 at the top end section 61a of the main pole layer 61 and a step 60a, on the insulation layer 60, with a pattern shape corresponding to that of the recess 69. That is a convex portion is formed. FIGS. 13c, 14c and 14j indicate a state where the resist pattern 70 is removed after the milling.

Thereafter, the nonmagnetic gap layer 62 is formed by for example sputtering of a nonmagnetic insulation material such as for example Al$_2$O$_3$ or SiO$_2$ on the main pole layer 61 and the insulation layer 60. FIGS. 13d, 14d, 14g and 14k indicate this state. As will be noted from these figures, a pattern shape corresponding to that of the recess 69 is also formed on the nonmagnetic gap layer 62.

As shown in FIGS. 5b and 6, the write coil insulation layer 64 made of a thermally cured novolak resist for example with a thickness of about 0.5-7 μm is formed on the nonmagnetic gap layer 62 and a layer for which description is omitted. Within the write coil insulation layer 64, the write coil layer 63 is formed by for example frame plating of a conductive material such as for example Cu to have a thickness of about 1-5 μm.

The auxiliary pole layer 65 with the pedestal section 65a and the return yoke section 65b is formed to cover this write coil insulation layer 64 by using for example frame plating to have a single layer of a metal material such as for example NiFe, CoFe, NiFeCo, FeAlSi, FeN, FeZrN, FeTaN, CoZrNb or CoZrTa or multi-layers thereof with a thickness of about 0.5-3 μm. FIGS. 13e, 14e, 14h and 14l indicate this state.

Figure 14L:
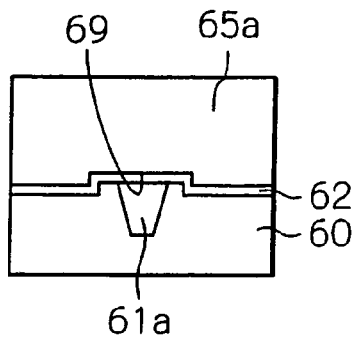

As will be noted from particularly FIG. 14l, the recess 69 with a convex plane shape is formed on the bottom surface of the pedestal section 65a and sidewalls thereof constitute the side shield sections 69a.

Thereafter, the protection layer 66 is formed on the inductive write head element (Step S5). The protection layer 66 is formed by for example sputtering of Al$_2$O$_3$ or SiO$_2$.

Then, the wafer process of thin-film magnetic heads is completed. After the wafer process, a fabrication process of the thin-film magnetic head such as machining process is performed. In the machining process, the wafer is cut into a plurality of bars so that each bar has a plurality of thin-film magnetic heads aligned with each other, then an ABS side surface of each bar is lapped to adjust MR height, and thereafter the bar is separated into individual thin-film magnetic heads. Since such machining process is well known in this art, detailed explanation is omitted in this specification.

Figure 15A:
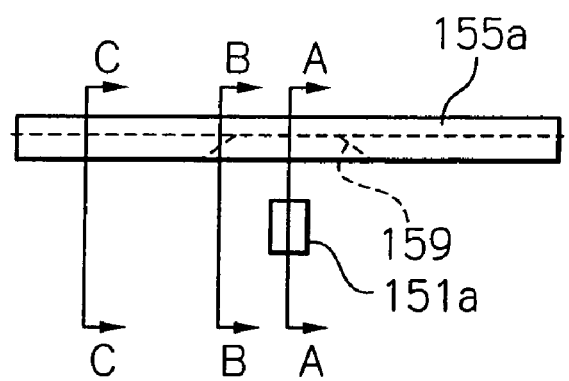
FIGS. 15a and 15b are views illustrating structures of a pedestal section of an auxiliary pole layer and a top end section of a main pole layer of an inductive write head element in another embodiment according to the present invention.
Figure 15B:
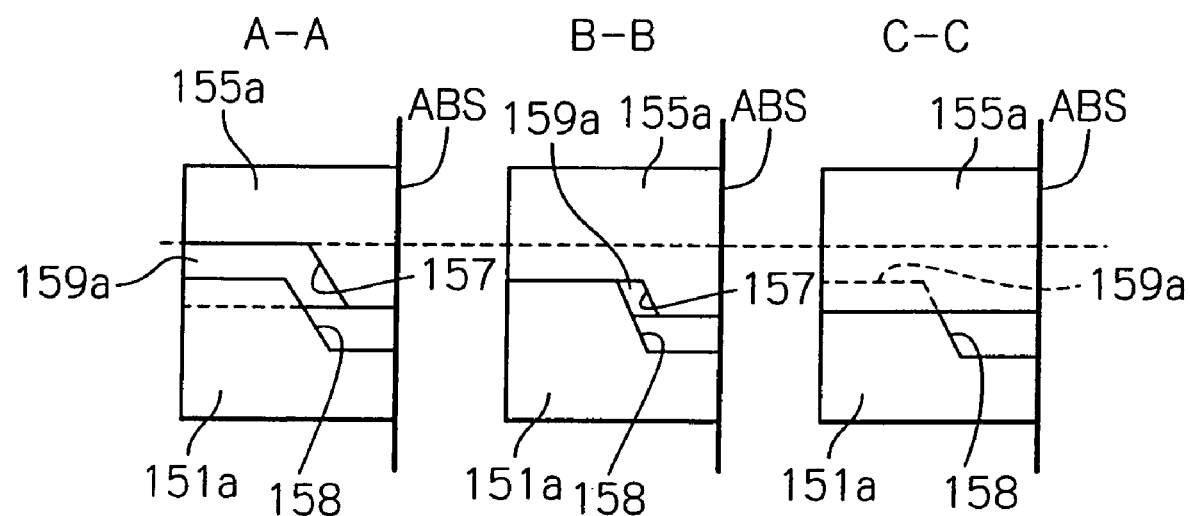
Figure 16:
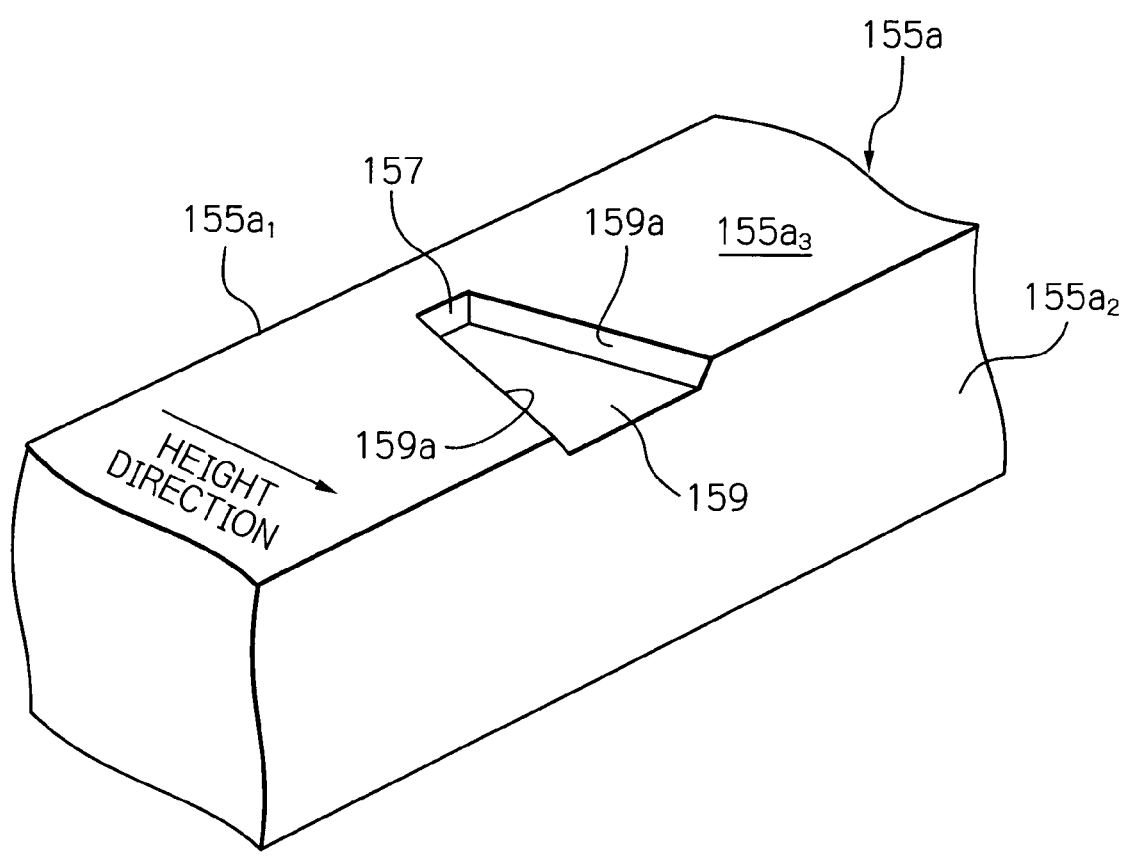
FIG. 16 is a perspective view illustrating only a bottom structure of the pedestal section of the auxiliary pole layer, seen from the bottom, in this embodiment.

FIGS. 15a and 15b illustrate structures of a pedestal section 155a of an auxiliary pole layer and a top end section 151a of a main pole layer of an inductive write head element in another embodiment according to the present invention. Particularly, FIG. 15a indicates positions of cross-sections A-A, B-B and C-C, and FIG. 15b indicates structures of these facing surfaces in this embodiment at the cross-sections A-A, B-B and C-C. FIG. 16 illustrates a bottom structure of the pedestal section 155a of the auxiliary pole layer, seen from the bottom or the opposite direction. In this embodiment, the structure of the thin-film magnetic head is the same as that of the embodiment of FIGS. 1-8 except for structure of an ABS side top end section of an inductive write head element. In this embodiment, an MR read head element consists of a TMR read head element. However, in modification, the MR read head element may be a CPP type GMR read head element.

As will be noted from FIGS. 15a and 15b and FIG. 16, the thin-film magnetic head in this embodiment has, on the bottom surface $155a_3$ of the pedestal section 155a of the auxiliary pole layer, a recess 159 running along the height direction from an inclined step 157. Both sidewalls of the recess 159 constitute side shield sections 159a. These side shield sections 159a face parts of side faces in the track-width direction, of the top end section 151a of the main pole layer. The recess 159 is formed on the bottom surface $155a_3$ of the pedestal section 155a along the height direction from the inclined step 157 and as shown in FIG. 15b lays over or covers a part of the top end section 151a of the main pole layer. Since the recess 159 therefore the side shield sections 159a are formed at the position not exposed to the ABS, a possible fringing magnetic field can be reduced without decreasing the write magnetic field. As a result, the write magnetic field can be increased without inducing ATE phenomenon.

Also, since such side shield sections 159a can be formed as will be mentioned later by only modifying the shape of a resist pattern when forming the inclined step 157, the manufacturing process never become complicated. In other words, it is possible to quite easily fabricate such side shield sections.

Next, a fabrication process of the composite thin-film magnetic head in this embodiment will be described in detail.

Flow of the fabrication process of the composite thin-film magnetic head in this embodiment is the same as that illustrated in FIG. 12. FIGS. 17a to 17e and FIGS. 18a to 18l illustrate a fabrication process of the main pole layer and the auxiliary pole layer in this composite thin-film magnetic head. Particularly, FIGS. 17a to 17e indicate plane views of the structure according to this embodiment. FIGS. 18a to 18e indicate central section views of the structure seen from a plane that is perpendicular to the track-width direction, FIGS. 18f to 18h indicate sectional views seen from the ABS, and FIGS. 18i to 18l indicate sectional views seen from a plane that is parallel to the ABS and passes through the top end 158a of an inclined step 158.

Hereinafter, only a part of the fabrication process of the main pole layer and the auxiliary pole layer other than that in the aforementioned embodiment of FIGS. 1 to 8 will be described.

Figure 17A:
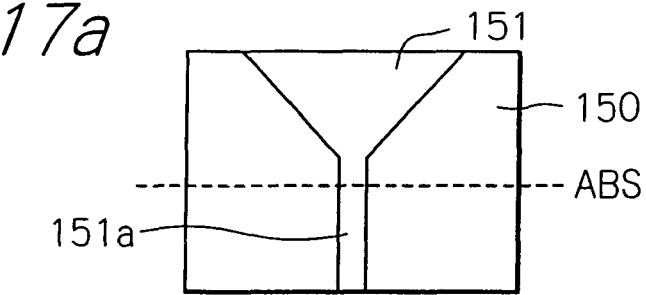
FIGS. 17a to 17e are process plane views illustrating a fabrication process of the main pole layer and the auxiliary pole layer in a composite thin-film magnetic head of this embodiment.

As shown in FIGS. 17a, 18a and 18f, on the backing coil insulation layer, formed is an insulation layer 151. A main pole layer 151 is formed on this insulation layer 150. The main pole layer 151 serves as a magnetic path for leading in convergence magnetic flux induced from the write coil layer to a perpendicular magnetic recording layer of the magnetic disk. Using for example frame plating to have a single layer of a metal material such as for example NiFe, CoFe, NiFeCo, FeAlSi, FeN, FeZrN, FeTaN, CoZrNb or CoZrTa or multi-layers thereof with a thickness of about 0.5-3 µm forms this main pole layer 151.

Figure 17B:
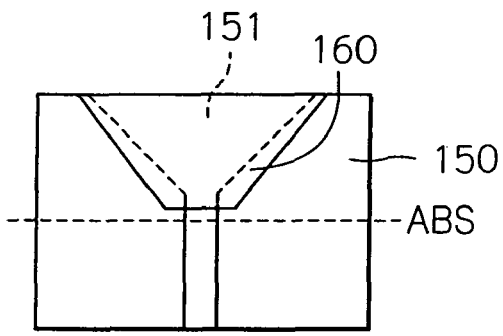

After forming the main pole layer 151, a resist pattern 160 with a trapezoidal plane shape as shown in FIGS. 17b, 18b and 18i is formed on the main pole layer 151 and the insulation layer 150. This resist pattern 160 has a pattern shape of the trapezoidal plane shape, that is, a pattern shape corresponding to the inclined steps 158 and 157 formed on the main pole layer 151 and the auxiliary pole layer 155 and also to the recess 159 formed on the auxiliary pole layer 155.

Figure 17C:
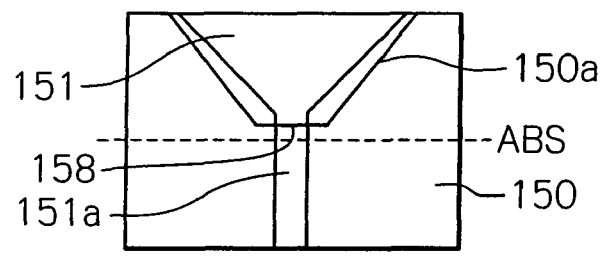
Figure 17D:
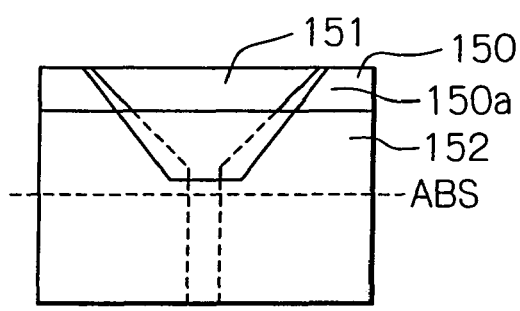
Figure 17E:
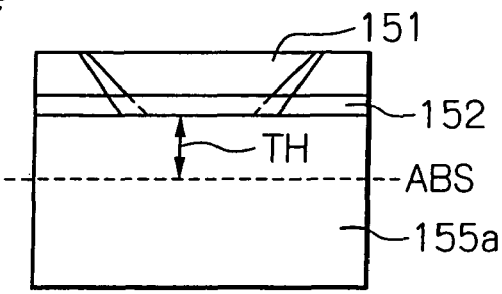

By performing an ion milling through the resist pattern 160, the main pole layer 151 and the insulation layer 150 with no resist pattern 160 are etched or dug to form the inclined step 158 at the top end section 151a of the main pole layer 151 and a step 150a, on the insulation layer 150, with a pattern shape corresponding to that of the recess 159. That is a convex portion is formed. FIGS. 17c, 18c and 18j indicate a state where the resist pattern 160 is removed after the milling.

Thereafter, a nonmagnetic gap layer 152 is formed by for example sputtering of a nonmagnetic insulation material such as for example $Al_2O_3$ or $SiO_2$ on the main pole layer 151 and the insulation layer 150. FIGS. 17d, 18d, 18g and 18k indicate this state. As will be noted from these figures, a pattern shape corresponding to that of the recess 159 is also formed on the nonmagnetic gap layer 152.

As already mentioned in the embodiment of FIGS. 1 to 8, a write coil insulation layer made of a thermally cured novolak resist for example with a thickness of about 0.5-7 µm is formed on the nonmagnetic gap layer 152 and a layer for which description is omitted. Within the write coil insulation layer, the write coil layer is formed by for example frame plating of a conductive material such as for example Cu to have a thickness of about 1-5 µm.

The auxiliary pole layer 155 with a pedestal section 155a and a return yoke section 155b is formed to cover this write coil insulation layer by using for example frame plating to have a single layer of a metal material such as for example NiFe, CoFe, NiFeCo, FeAlSi, FeN, FeZrN, FeTaN, CoZrNb or CoZrTa or multi-layers thereof with a thickness of about 0.5-3 µm. FIGS. 17e, 18e, 18h and 18l indicate this state.

As will be noted from particularly FIG. 18l, the recess 159 with a trapezoidal plane shape is formed on the bottom surface of the pedestal section 155a and sidewalls thereof constitute side shield sections 159a.

Thereafter, a protection layer is formed on the inductive write head element. Then, the wafer process of thin-film magnetic heads is completed. After the wafer process, a fabrication process of the thin-film magnetic head such as machining process is performed. In the machining process, the wafer is cut into a plurality of bars so that each bar has a plurality of thin-film magnetic heads aligned with each other, then an ABS side surface of each bar is lapped to adjust MR height, and thereafter the bar is separated into individual thin-film magnetic heads. Since such machining process is well known in this art, detailed explanation is omitted in this specification.

Figure 19A:
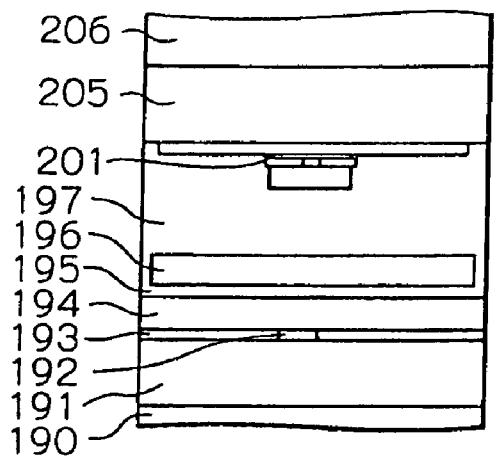
FIGS. 19a and 19b are an ABS side view and a central cross sectional view schematically illustrating the structure of a composite thin-film magnetic head in further embodiment according to the present invention.
Figure 19B:
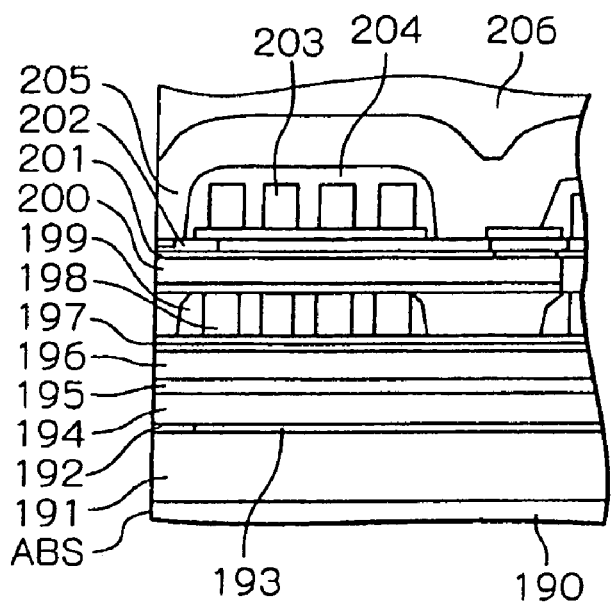
Figure 20:
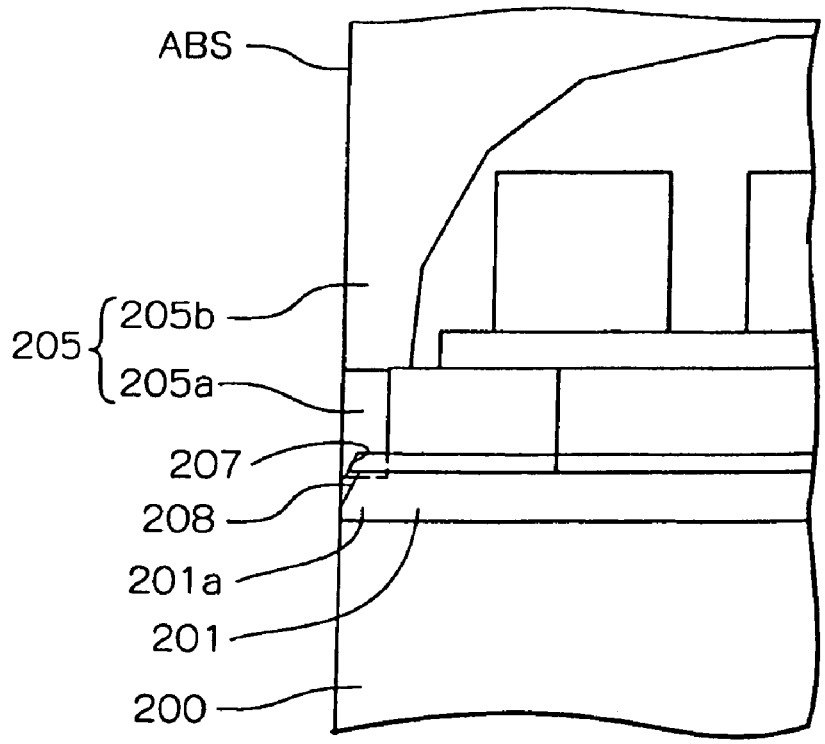
FIG. 20 is an enlarged cross sectional view schematically illustrating an ABS side top end section of an inductive write head element in FIG. 19b.

FIGS. 19a and 19b schematically illustrate the structure of a composite thin-film magnetic head of further embodiment according to the present invention, and FIG. 20 illustrates in close up an ABS side top end section of the inductive write head element in FIG. 19b. FIGS. 19b and 20 indicate a cross-section along a plane perpendicular to the ABS of the composite thin-film magnetic head and perpendicular to the track-width direction. In this embodiment, the structure of the thin-film magnetic head is the same as that of the embodiment of FIGS. 1-8 except for structure of an ABS side top end section of an inductive write head element. In this embodiment, an MR read head element consists of a TMR read head element. However, in modification, the MR read head element may be a CPP type GMR read head element.

In FIGS. 19a and 19b, reference numeral 190 denotes an under insulation layer stacked on a wafer or substrate (not shown), 191 denotes a lower electrode layer which serves also as a lower shield layer (SF), 192 denotes a TMR multi-layered structure stacked on the lower electrode layer 191, 193 denotes an insulation layer stacked also on the lower electrode layer 191, and 194 denotes an upper electrode layer which serves also as a upper shield layer (SS1), stacked on the TMR multi-layered structure 192 and the insulation layer 193, respectively. The TMR read head element is basically composed of the under insulation layer 190, the lower electrode layer 191, the TMR multi-layer 192, the insulation layer 193 and the upper electrode layer 194.

On the TMR read head element, an insulation layer 195 and a soft magnetic layer 196 are stacked. On the soft magnetic layer 196, the inductive write head element with a perpendicular magnetic recording structure is formed.

The inductive write head element is basically composed of an insulation layer 197, a backing coil layer 198, a backing coil insulation layer 199, an insulation layer 200, a main pole layer 201, a nonmagnetic gap layer 202, a write coil layer 203, a write coil insulation layer 204 and an auxiliary pole layer 205. On the auxiliary pole layer 205, a protection layer 206 is stacked.

As shown in FIG. 20, the auxiliary pole layer 205 has a pedestal section 205a formed at its ABS side top end portion, and a return yoke section 205b magnetically connected with this pedestal section 205a. The pedestal section 205a of the auxiliary pole layer 205 and a top end section 201a of the main pole layer 201 are faced each other via the nonmagnetic gap layer 202. The facing surfaces of the pedestal section 205a and the top end section 201a have inclined step or two-level portions 207 and 208 with slopes inclined with respect to a lamination plane at retracted positions in a height direction from the ABS, that is, at positions exposed to the ABS, respectively, as shown in FIG. 20. By forming such inclined steps 207 and 208, it is possible to increase write magnetic field toward a magnetic recording medium. In this embodiment, particularly, a part of the inclined step 208 of the top end section 201a of the main pole layer 201 exposes to the ABS.

Figure 21A:
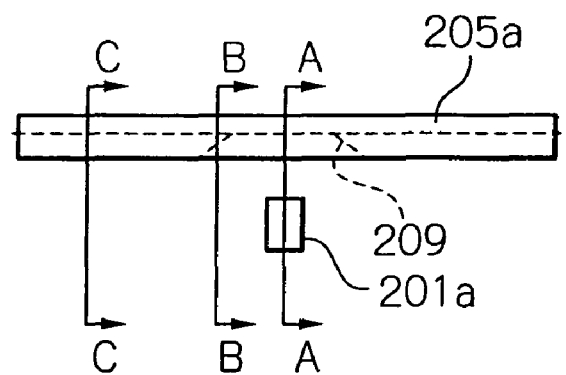
FIGS. 21a and 21b are views illustrating structures of a pedestal section of an auxiliary pole layer and a top end section of a main pole layer in this embodiment.
Figure 21B:
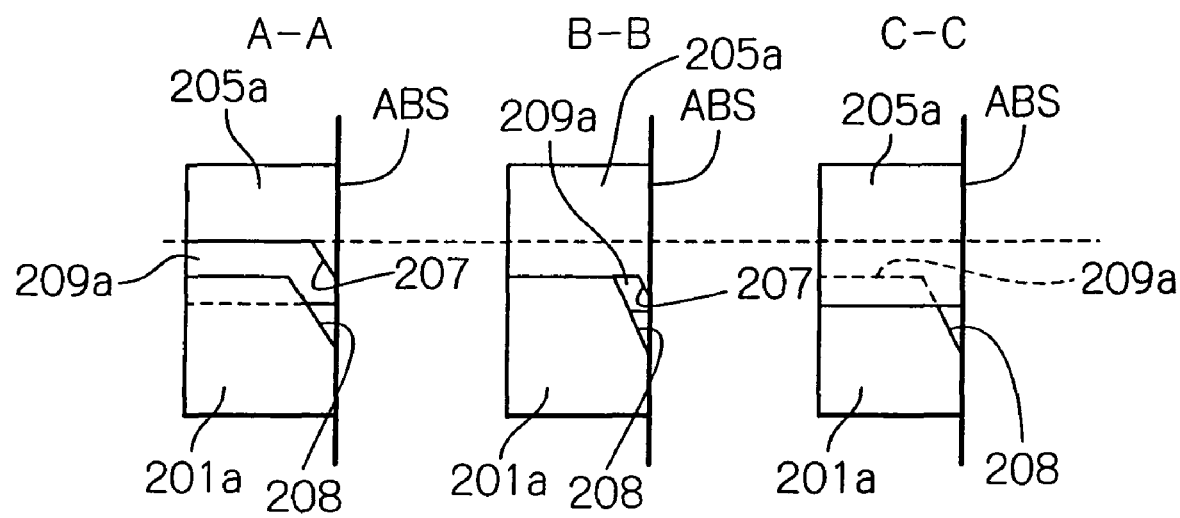
Figure 22:
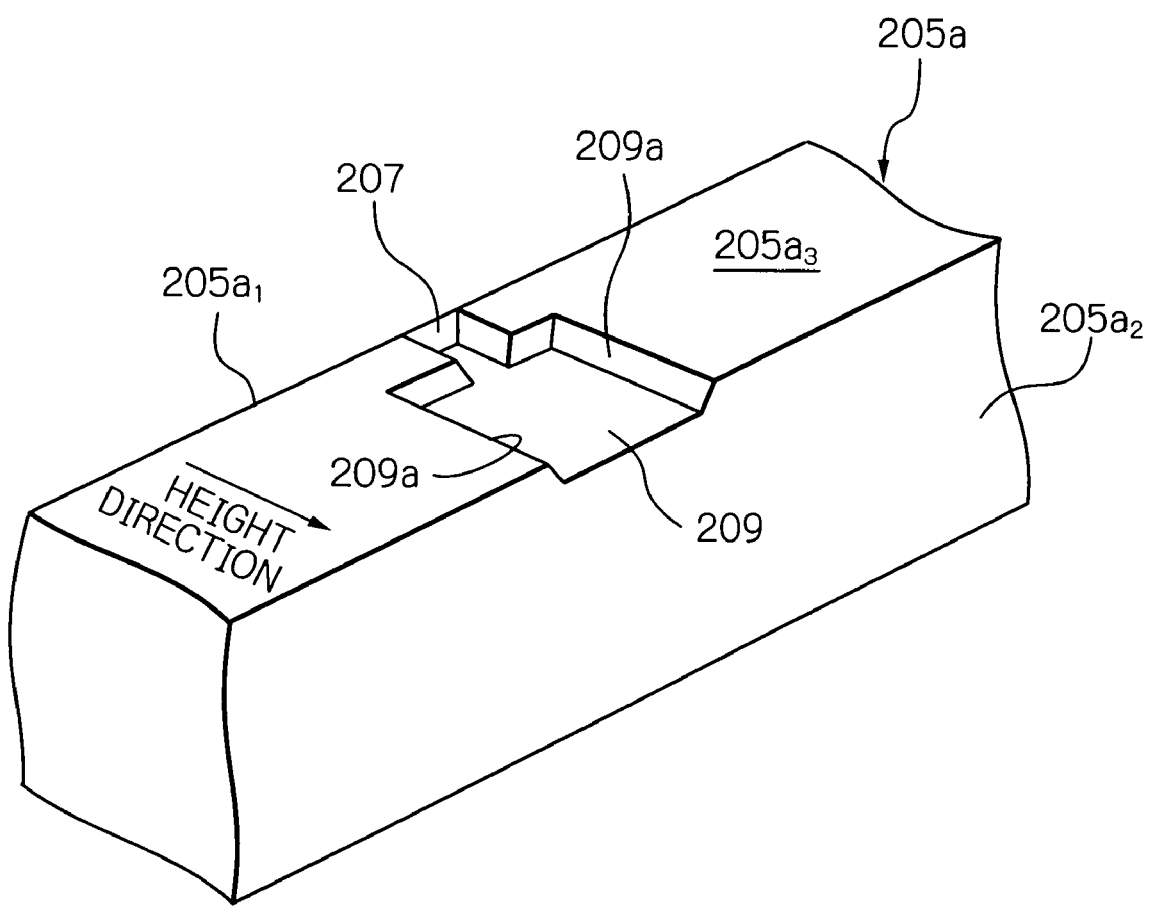
FIG. 22 is a perspective view illustrating only a bottom structure of the pedestal section of the auxiliary pole layer, seen from the bottom, in this embodiment.

FIGS. 21a and 21b illustrate structures of the pedestal section 205a of the auxiliary pole layer 205 and the top end section 201a of the main pole layer 201. Particularly, FIG. 21a indicates positions of cross-sections A-A, B-B and C-C, and FIG. 21b indicates structures of these facing surfaces in this embodiment at the cross-sections A-A, B-B and C-C. It should be noted that FIG. 21b is illustrated such that the positions of the ABSs are inverted from these of FIGS. 19b and 20. FIG. 22 illustrates a bottom structure of the pedestal section 205a of the auxiliary pole layer 205, seen from the bottom or the opposite direction.

As will be noted from FIGS. 21a and 21b and FIG. 22, the thin-film magnetic head in this embodiment has, on the bottom surface $205a_3$ of the pedestal section 205a of the auxiliary pole layer 205, a recess 209 running along the height direction from the inclined step 207. Both sidewalls of the recess 209 constitute side shield sections 209a. These side shield sections 209a face parts of side faces in the track-width direction, of the top end section 201a of the main pole layer 201. The recess 209 is formed on the bottom surface $205a_3$ of the pedestal section 205a along the height direction from the inclined step 207 and as shown in FIG. 21b lays over or covers a part of the top end section 201a of the main pole layer 201. Since the recess 209 therefore the side shield sections 209a are formed at the position not exposed to the ABS, a possible fringing magnetic field can be reduced without decreasing the write magnetic field. As a result, the write magnetic field can be increased without inducing ATE phenomenon.

Also, since such side shield sections 209a can be formed as will be mentioned later by only modifying the shape of a resist pattern when forming the inclined step 207, the manufacturing process never become complicated. In other words, it is possible to quite easily fabricate such side shield sections.

Next, a fabrication process of the composite thin-film magnetic head in this embodiment will be described in detail.

Flow of the fabrication process of the composite thin-film magnetic head in this embodiment is the same as that illustrated in FIG. 12. FIGS. 23a to 23e and FIGS. 24a to 24l illustrate a fabrication process of the main pole layer and the auxiliary pole layer of FIG. 12. Particularly, FIGS. 23a to 23e indicate plane views of the structure according to this embodiment. FIGS. 24a to 24e indicate central section views of the structure seen from a plane that is perpendicular to the track-width direction, FIGS. 24f to 24h indicate sectional views seen from the ABS, and FIGS. 24i to 24l indicate sectional views seen from a plane that is parallel to the ABS and passes through the top end 208a of an inclined step 208.

As shown in FIGS. 12, 19b and 20, first, a substrate made of a conductive material, such as AlTiC, $Al_2O_3$—TiC is prepared and an under insulation layer 190 is deposited on the substrate by sputtering for example (Step S1 of FIG. 12). This layer 190 is made of an insulating material, such as $Al_2O_3$ or $SiO_2$, with a thickness of about 0.05 to 10 μm.

Then, on the under insulation layer 190, a TMR read head element including a lower electrode layer that serves also as a lower shield layer (SF) 191, a TMR multi-layered structure 192, an insulation layer 193 and an upper electrode layer that serves also as an upper shield layer (SS1) 194 is formed (Step S2 of FIG. 12).

Then, on the TMR read head element, an insulation layer 195 and a soft magnetic layer 196 are formed (Step S3 of FIG. 12). The insulation layer 195 is formed by for example sputtering or CVD of an insulation material such as $Al_2O_3$, $SiO_2$, AlN or DLC to have a thickness of about 0.3 μm. The soft magnetic layer 196 is formed by for example frame plating of a magnetic metal material such as NiFe, CoFe, NiFeCo, FeAlSi, FeN, FeZrN, FeTaN, CoZrNb or CoZrTa to have a thickness of about 1.0 μm. These insulation layer 195 and the soft magnetic layer 196 function to separate the TMR read head element and an inductive write head element formed thereon.

Thereafter, on the soft magnetic layer 196, an inductive write head element including the insulation layer 197, the backing coil layer 198, the backing coil insulation layer 199, the insulation layer 200, the main pole layer 201, the nonmagnetic gap layer 202, the write coil layer 203, the write coil insulation layer 204 and the auxiliary pole layer 205 is formed (Step S4 of FIG. 12).

The insulation layer 197 is formed on the soft magnetic layer 196 by for example sputtering of an insulation material such as $Al_2O_3$ or $SiO_2$. If necessary, a top surface of the insulation layer 197 is planarized by CMP for example. On the insulation layer 197, the backing coil layer 198 is formed by for example frame plating of a conductive material such as for example Cu to have a thickness of about 1-5 μm. The backing coil insulation layer 199 is formed to coat the backing coil layer 198 by for example photolithography of a resist material such as thermally cured novolac resist for example to have a thickness of about 0.5-7 μm.

Figure 23A:
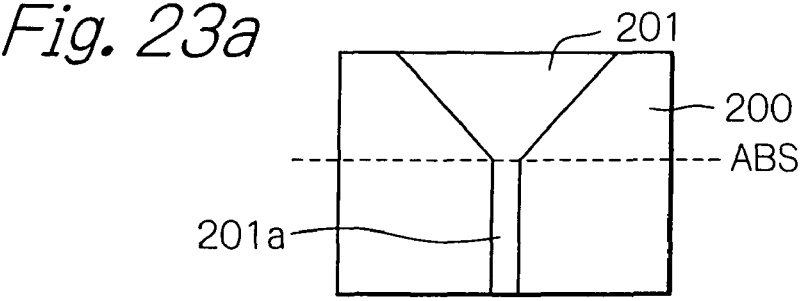
FIGS. 23a to 23e are process plane views illustrating a fabrication process of the main pole layer and the auxiliary pole layer in this composite thin-film magnetic head.

On the backing coil insulation layer 199, formed is the insulation layer 201. The main pole layer 201 is formed on this insulation layer 200. FIGS. 23a, 24a and 24f indicate this state. The main pole layer 201 serves as a magnetic path for leading in convergence magnetic flux induced from the write coil layer 203 to a perpendicular magnetic recording layer of the magnetic disk. Using for example frame plating to have a single layer of a metal material such as for example NiFe, CoFe, NiFeCo, FeAlSi, FeN, FeZrN, FeTaN, CoZrNb or CoZrTa or multi-layers thereof with a thickness of about 0.5-3 μm forms this main pole layer 201.

Figure 23B:
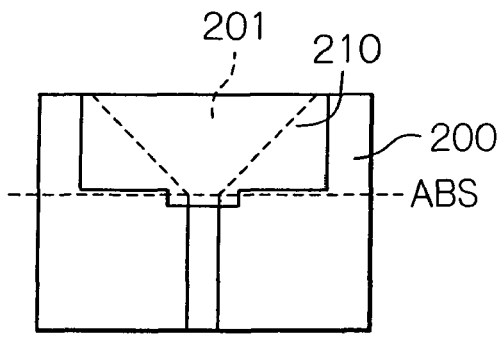

After forming the main pole layer 201, a resist pattern 210 with a convex plane shape as shown in FIGS. 23b, 24b and 24i is formed on the main pole layer 201 and the insulation layer 200. This resist pattern 210 has a pattern shape of the convex plane shape, that is, a pattern shape corresponding to the inclined steps 208 and 207 formed on the main pole layer 201 and the auxiliary pole layer 205 and also to the recess 209 formed on the auxiliary pole layer 205.

Figure 23C:
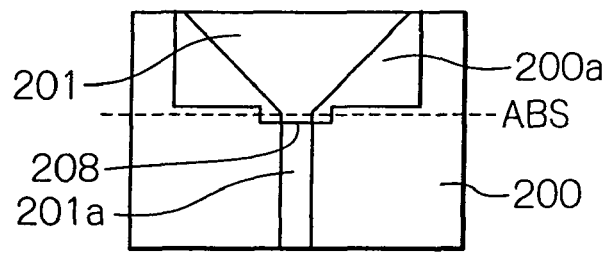
Figure 23D:
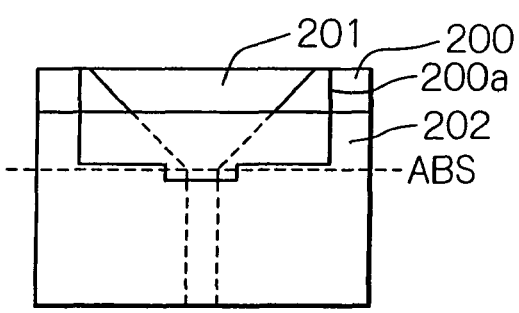
Figure 23E:
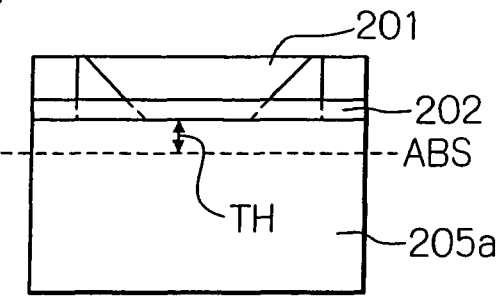

By performing an ion milling through the resist pattern 210, the main pole layer 201 and the insulation layer 200 with no resist pattern 210 are etched or dug to form the inclined step 208 at the top end section 201a of the main pole layer 201 and a step 200a, on the insulation layer 200, with a pattern shape corresponding to that of the recess 209. That is a convex portion is formed. FIGS. 23c, 24c and 24j indicate a state where the resist pattern 210 is removed after the milling.

Thereafter, the nonmagnetic gap layer 202 is formed by for example sputtering of a nonmagnetic insulation material such as for example $Al_2O_3$ or $SiO_2$ on the main pole layer 201 and the insulation layer 200. FIGS. 23d, 24d, 24g and 24k indicate this state. As will be noted from these figures, a pattern shape corresponding to that of the recess 209 is also formed on the nonmagnetic gap layer 202.

As shown in FIGS. 19b and 20, the write coil insulation layer 204 made of a thermally cured novolak resist for example with a thickness of about 0.5-7 µm is formed on the nonmagnetic gap layer 202 and a layer for which description is omitted. Within the write coil insulation layer 204, the write coil layer 203 is formed by for example frame plating of a conductive material such as for example Cu to have a thickness of about 1-5 µm.

The auxiliary pole layer 205 with the pedestal section 205a and the return yoke section 205b is formed to cover this write coil insulation layer 204 by using for example frame plating to have a single layer of a metal material such as for example NiFe, CoFe, NiFeCo, FeAlSi, FeN, FeZrN, FeTaN, CoZrNb or CoZrTa or multi-layers thereof with a thickness of about 0.5-3 µm. FIGS. 23e, 24e, 24h and 24l indicate this state.

As will be noted from particularly FIG. 24l, the recess 209 with a convex plane shape is formed on the bottom surface of the pedestal section 205a and sidewalls thereof constitute the side shield sections 209a.

Thereafter, the protection layer 206 is formed on the inductive write head element (Step S5 of FIG. 12). The protection layer 206 is formed by for example sputtering of $Al_2O_3$ or $SiO_2$.

Then, the wafer process of thin-film magnetic heads is completed. After the wafer process, a fabrication process of the thin-film magnetic head such as machining process is performed. In the machining process, the wafer is cut into a plurality of bars so that each bar has a plurality of thin-film magnetic heads aligned with each other, then an ABS side surface of each bar is lapped to adjust MR height, and thereafter the bar is separated into individual thin-film magnetic heads. Since such machining process is well known in this art, detailed explanation is omitted in this specification.

Particularly, in this embodiment, during the machining process of each bar, the bar is lapped until a part of the inclined step 208 of the top end section 201a of the main pole layer 201 exposes to the ABS.

In the aforementioned embodiments, the inductive write head element has the structure with the main pole layer, the nonmagnetic gap layer and the auxiliary pole layer arranged in this order from the substrate side. However, in modifications, the inductive write head element may have a structure with an auxiliary pole layer, a nonmagnetic gap layer and a main pole layer arranged in this order from the substrate side, or a structure with two auxiliary pole layers arranged at upper and lower sides of a main pole layer, respectively.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A thin-film magnetic head with a perpendicular magnetic recording structure, comprising:
a main pole layer;
a nonmagnetic gap layer;
an auxiliary pole layer facing said main pole layer via said nonmagnetic gap layer;
a surface of a top end section of said auxiliary pole layer having a first inclined step that slopes with respect to a lamination plane of the layers; and
a surface of a top end section of said main pole layer having a second inclined step that slopes with respect to the lamination plane of the layers, said surface of the top end section of said main pole layer facing the top end section of said auxiliary pole layer, said first inclined step facing said second inclined step,
said top end section of said auxiliary pole layer having a recess running along a height direction from said first inclined step, said recess being formed at a position that is not exposed to an air bearing surface, said height direction being a direction leaving from and perpendicular to the air bearing surface, and side walls of said recess facing at least part of side surfaces in a track-width direction of said main pole layer so as to cover at least part of said second inclined step, and
a distance between a side surface in the track-width direction, of said top end section of said main pole layer and said side walls of said recess is 4 µm or less.

2. The thin-film magnetic head as claimed in claim 1, wherein said second inclined step is formed at a position not exposed to the air-bearing surface.

3. The thin-film magnetic head as claimed in claim 1, wherein said second inclined step is formed at a position exposed to the air-bearing surface.

4. The thin-film magnetic head as claimed in claim 1, wherein the distance between the side surface in the track-width direction, of said top end section of said main pole layer and said side walls of said recess is less than 0.2 µm.

5. The thin-film magnetic head as claimed in claim 1, wherein the distance between the side surface in the track-width direction, of said top end section of said main pole layer and said side walls of said recess is less than five times of a gap width of said nonmagnetic gap layer.

6. The thin-film magnetic head as claimed in claim 1, wherein said thin-film magnetic head comprises an inductive write head element having said main pole layer, said nonmagnetic gap layer and said auxiliary pole layer, and a magnetoresistive effect read head element.

7. A magnetic head assembly having a thin-film magnetic head with a perpendicular magnetic recording structure, and a support member for supporting said thin-film magnetic head, said thin-film magnetic head comprising:
a main pole layer;
a nonmagnetic gap layer;
an auxiliary pole layer facing said main pole layer via said nonmagnetic gap layer;
a surface of a top end section of said auxiliary pole layer having a first inclined step that slopes with respect to a lamination plane of the layers; and
a surface of a top end section of said main pole layer having a second inclined step that slopes with respect to the lamination plane of the layers, said surface of the top end section of said main pole layer facing the top end section of said auxiliary pole layer, said first inclined step facing said second inclined step, said top end section of said auxiliary pole layer having a recess running along a height direction from said first inclined step, said recess being formed at a position that is not exposed to an air bearing surface, said height direction being a direction leaving from and perpendicular to the air bearing surface, and side walls of said recess facing at least part of side surfaces in a track-width direction of said main pole layer so as to cover at least part of said second inclined step, and a distance between a side surface in the track-width direction, of said top end section of said main pole layer and said side walls of said recess is 4 µm or less.

8. A magnetic disk drive apparatus having at least one magnetic disk, at least one thin-film magnetic head with a perpendicular magnetic recording structure, and at least one support member for supporting said at least one thin-film magnetic head, said at least one thin-film magnetic head comprising:

a main pole layer;
a nonmagnetic gap layer;
an auxiliary pole layer facing said main pole layer via said nonmagnetic gap layer;
a surface of a top end section of said auxiliary pole layer having a first inclined step that slopes with respect to a lamination plane of the layers; and
a surface of a top end section of said main pole layer having a second inclined step that slopes with respect to the lamination plane of the layers, said surface of the top end section of said main pole layer facing the top end section of said auxiliary pole layer, said first inclined step facing said second inclined step, said top end section of said auxiliary pole layer having a recess running along a height direction from said first inclined step, said recess being formed at a position that is not exposed to an air bearing surface, said height direction being a direction leaving from and perpendicular to the air bearing surface, and side walls of said recess facing at least part of side surfaces in a track-width direction of said main pole layer so as to cover at least part of said second inclined step, and a distance between a side surface in the track-width direction, of said top end section of said main pole layer and said side walls of said recess is 4 µm or less.

9. A manufacturing method of a thin-film magnetic head with a perpendicular magnetic recording structure, said thin-film magnetic head comprising:
a main pole layer;
a nonmagnetic gap layer;
an auxiliary pole layer facing said main pole layer via said nonmagnetic gap layer;
a surface of a top end section of said auxiliary pole layer having a first inclined step that slopes with respect to a lamination plane of the layers; and
a surface of a top end section of said main pole layer having a second inclined step that slopes with respect to the lamination plane of the layers, said surface of the top end section of said main pole layer facing the top end section of said auxiliary pole layer, said first inclined step facing said second inclined step, said top end section of said auxiliary pole layer having a recess running along a height direction from said first inclined step, said recess being formed at a position that is not exposed to an air bearing surface, said height direction being a direction leaving from and perpendicular to the air bearing surface, and side walls of said recess facing at least part of side surfaces in a track-width direction of said main pole layer so as to cover at least part of said second inclined step, said manufacturing method comprising the steps of:
forming the main pole layer on an insulation layer;
forming a convex portion with sloped side surfaces on the top end sections of said main pole layer and said insulation layer at a position not exposed to the air bearing surface, by milling through a mask a part of the top end sections of said main pole layer and said insulation layer;
forming the nonmagnetic gap layer on said main pole layer and said insulation layer with the formed convex portion; and
forming on said nonmagnetic gap layer the auxiliary pole layer with the top end section that faces said main pole layer and has the recess corresponding to said convex portion, said convex portion forming step comprises a step of milling the part of the top end sections of said main pole layer and said insulation layer so that a distance between a side surface in the track-width direction, of said top end section of said main pole layer and said side walls of said recess is 4 µm or less.

10. The manufacturing method as claimed in claim 9, wherein the convex portion forming step comprises a step of milling the part of the top end sections of said main pole layer and said insulation layer so that the distance between the side surface in the track-width direction, of said top end section of said main pole layer and said side walls of said recess is less than 0.2 µm.

11. The manufacturing method as claimed in claim 9, wherein the convex portion forming step comprises a step of milling the part of the top end sections of said main pole layer and said insulation layer so that the distance between the side surface in the track-width direction, of said top end section of said main pole layer and said side walls of said recess is less than five times of a gap width of said nonmagnetic gap layer.

12. The manufacturing method as claimed in claim 9, wherein said method comprises a step of forming an inductive write head element having said main pole layer, said nonmagnetic gap layer and said auxiliary pole layer after forming a magnetoresistive effect read head element.

* * * * *